US008267791B2

(12) United States Patent
Sugiyama et al.

(10) Patent No.: US 8,267,791 B2
(45) Date of Patent: Sep. 18, 2012

(54) SERVER SYSTEM, SCHEDULE MANAGEMENT DEVICE AND METHOD

(75) Inventors: Koji Sugiyama, Yokohamashi (JP); Yuuki Oomori, Kawasaki (JP)

(73) Assignee: Namco Bandai Games Inc., Tokyo (JP)

( * ) Notice: Subject to any disclaimer, the term of this patent is extended or adjusted under 35 U.S.C. 154(b) by 1279 days.

(21) Appl. No.: 11/979,206

(22) Filed: Oct. 31, 2007

(65) Prior Publication Data

US 2008/0108438 A1 May 8, 2008

(30) Foreign Application Priority Data

Nov. 2, 2006 (JP) ................................. 2006-298496

(51) Int. Cl.
*A63F 9/24* (2006.01)
(52) U.S. Cl. ........................................... 463/42; 463/40
(58) Field of Classification Search .................. 463/23, 463/30, 42, 43, 40
See application file for complete search history.

(56) References Cited

U.S. PATENT DOCUMENTS

| 8,109,821 B2* | 2/2012 | Kovacs et al. ................... 463/16 |
| 2001/0034766 A1* | 10/2001 | Morimoto ..................... 709/205 |
| 2003/0093168 A1 | 5/2003 | Nagaoka |
| 2003/0114218 A1* | 6/2003 | McClintic ....................... 463/25 |
| 2004/0097287 A1* | 5/2004 | Postrel ............................ 463/41 |
| 2004/0204235 A1* | 10/2004 | Walker et al. ................... 463/29 |
| 2004/0229700 A1* | 11/2004 | Cannon et al. .................. 463/42 |
| 2005/0101386 A1* | 5/2005 | Lavanchy et al. ............... 463/42 |
| 2005/0143166 A1* | 6/2005 | Walker et al. ................... 463/25 |
| 2007/0077999 A1* | 4/2007 | Inubushi et al. ................ 463/42 |
| 2007/0173323 A1* | 7/2007 | Johnson et al. ................. 463/42 |
| 2007/0191101 A1* | 8/2007 | Coliz et al. ...................... 463/42 |
| 2007/0202863 A1* | 8/2007 | Winchell ....................... 455/418 |
| 2007/0202953 A1 | 8/2007 | Taninami |
| 2008/0026846 A1* | 1/2008 | McMaster ....................... 463/42 |

FOREIGN PATENT DOCUMENTS

| JP | A-11-76579 | 3/1999 |
| JP | A-2000-116956 | 4/2000 |
| JP | A-2002-177601 | 6/2002 |
| JP | A-2003-135854 | 5/2003 |
| JP | A-2006-26237 | 2/2006 |
| JP | A-2006-043091 | 2/2006 |
| JP | A-2006-288528 | 10/2006 |

OTHER PUBLICATIONS

Asuka et al., "Sangokushi-taisen", ARCADIA, Enterbrain Inc., Jun. 1, 2005, p. 34, vol. 6, No. 6 (with partial English-language translation).

"World Soccer, Winning Eleven, Arcade Game Style 2003", ARCADIA, Enterbrain Inc. Nov. 1, 2003, pp. 66-67, vol. 4, No. 11 (with partial English-language translation).

"Ima, Arcade Game ga aratana stage he! Kidō Senshi Gundam: Senjō no Kizuna", Amusement Journal, Amusement Journal Co., Ltd., May 30, 2006, pp. 106-109, vol. 6, No. 6, Whole issue No. 062 (with partial English-language translation).

* cited by examiner

*Primary Examiner* — Peter DungBa Vo
*Assistant Examiner* — Nicholas Ditoro
(74) *Attorney, Agent, or Firm* — Oliff & Berridge, PLC

(57) ABSTRACT

Local groups LG formed of players belonging to the same team are generated in store units. The local groups LG of each team are combined to generate groups G of each team (group Ga of team A and group Gb of team B). The groups G of which the number of players is the same and which belong to different teams are matched as opposite groups.

18 Claims, 36 Drawing Sheets

FIG. 12
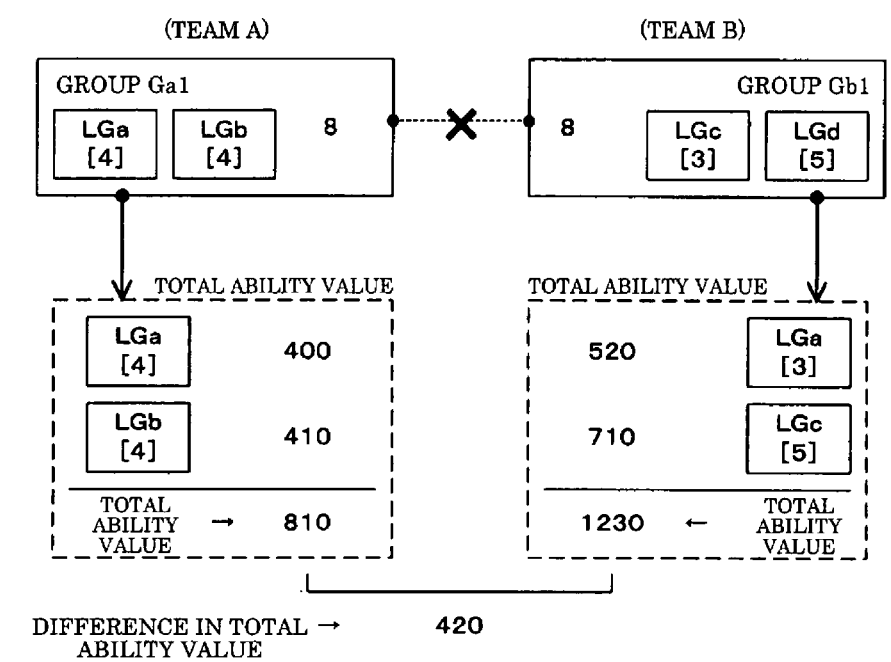
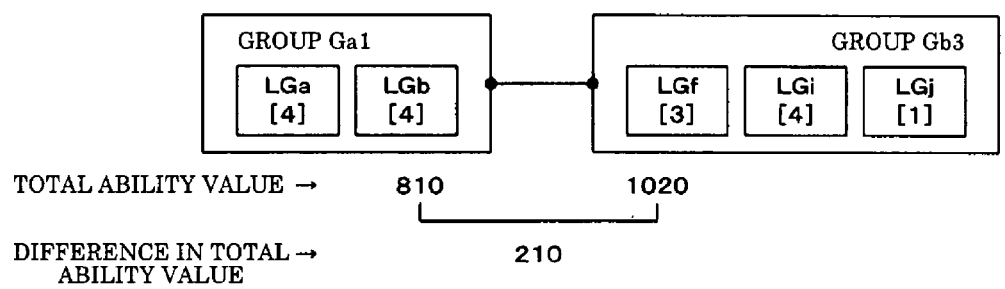

FIG. 15

| TIME | TEAM | RESERVABLE NUMBER |
|---|---|---|
| 14:00 | TEAM A | 8 |
| 14:10 | TEAM B | 6 |
| 14:20 | TEAM A | × |
| 14:30 | TEAM B | 1 |
| ⋮ | | |

◆ RESERVATION STATE: OCTOBER 31, TUESDAY

BEFORE △

NEXT ▽

PLEASE INSERT GAME CARD FOR RESERVATION

FIG. 16

◆ LATEST VACANCY STATE    15:30

TEAM A

| TIME | RESERVABLE NUMBER |
|---|---|
| 15:40 | 8 |
| 16:00 | 6 |
| 16:20 | 1 |
| 16:20 | 1 |

TEAM B

| TIME | RESERVABLE NUMBER |
|---|---|
| 15:50 | 8 |
| 16:30 | 6 |
| 16:50 | 1 |
| 16:50 | 1 |

PLEASE INSERT GAME CARD FOR RESERVATION

FIG. 22

[LEVEL-ABILITY VALUE CONVERSION TABLE] 223

| LEVEL | ABILITY VALUE |
|-------|---------------|
| 1 | 100 |
| 2 | 120 |
| 3 | 135 |
| ⋮ | ⋮ |

[ALMOST EQUAL CONDITION INFORMATION] 225

| DIFFERENCE IN AVERAGE ABILITY VALUE | 200 OR LESS |
|---|---|

MATCHING INFORMATION

- 239a — MATCHING ID : M065
- 239b — NUMBER OF PLAYERS : 8

(TEAM A)

| | PLAYER ID (239c) | PLAYER NAME (239d) | TERMINAL ID (239e) | STORE NAME (239f) |
|---|---|---|---|---|
| 1 | P001 | ABC | T003 | STORE A |
| 2 | P002 | XYZ | T005 | STORE A |
| ⋮ | ⋮ | ⋮ | ⋮ | ⋮ |
| 8 | P069 | HELLO ! | T064 | STORE D |

(TEAM B)

| | PLAYER ID (239c) | PLAYER NAME (239d) | TERMINAL ID (239e) | STORE NAME (239f) |
|---|---|---|---|---|
| 1 | P031 | aaa | T016 | STORE B |
| 2 | P048 | bbb | T014 | STORE B |
| ⋮ | ⋮ | ⋮ | ⋮ | ⋮ |
| 8 | P051 | SKY | T071 | STORE F |

GAME CARD — 80

| | |
|---|---|
| CARD ID | CR00359 |

81 — CARD ID row
82 — (PLAYER DATA)

| | |
|---|---|
| PLAYER ID | P001 |
| PLAYER NAME | ABC |
| LEVEL | 12 |
| TEAM | TEAM A |

82a — PLAYER ID
82b — PLAYER NAME
82c — LEVEL
82d — TEAM

83 — (RESERVATION DATA)

| | |
|---|---|
| RESERVED STORE | STORE A |
| RESERVED DATE | 10/30 17:15 |
| NEW FLAG | 1 |

83a — RESERVED STORE
83b — RESERVED DATE
84 — NEW FLAG

FIG. 31

PLAY ASSIGNMENT INFORMATION — 623

| | | |
|---|---|---|
| DATE | 10/29 14:00 | |
| TEAM NAME | TEAM A | |
| TERMINAL ID | PLAYER ID | PLAYER NAME |
| T001 | P045 | abc |
| T002 | P021 | TARO |
| ⋮ | ⋮ | ⋮ |
| T008 | P003 | xxx |

623a — DATE
623b — TEAM NAME
623c — TERMINAL ID
623d — PLAYER ID
623e — PLAYER NAME

FIG. 41

◆ PRESENT RESERVATION SATE  　　　　　　　15:30
　PRESENT GAME NO. 1645

| GAME NO. | TEAM | RESERVABLE NUMBER | SCHEDULED START TIME |
|---|---|---|---|
| 1646 | TEAM A | × | 15:35 |
| 1647 | TEAM B | 6 | 15:45 |
| 1648 | TEAM A | 2 | 15:55 |
| ⋮ | | | ▽ NEXT |

PLEASE INSERT GAME CARD FOR RESERVATION

FIG. 42

◆ LATEST VACANCY STATE  　　　　　　　15:30
　PRESENT GAME NO. 1645

TEAM A

| GAME NO. | RESERVABLE NUMBER |
|---|---|
| 1648 | 2 |
| 1650 | 8 |
| 1654 | 3 |
| 1656 | 7 |

TEAM B

| GAME NO. | RESERVABLE NUMBER |
|---|---|
| 1647 | 6 |
| 1649 | 4 |
| 1651 | 1 |
| 1655 | 1 |

PLEASE INSERT GAME CARD FOR RESERVATION

SERVER SYSTEM, SCHEDULE MANAGEMENT DEVICE AND METHOD

Japanese Patent Application No. 2006-298496 filed on Nov. 2, 2006, is hereby incorporated by reference in its entirety.

BACKGROUND OF THE INVENTION

The present invention relates to a server system which forms groups by performing a matching process and the like.

As one type of game, a network game has been known in which game devices and a game server are connected via a communication network and players enjoy a game while sharing the same game space. In the network game, the game server combines (matches) arbitrary players from unspecified players and allows the combined players to play a game (see JP-A-2006-43091, for example).

As one type of network game, a group match game in which groups of players play a match is known. The following problem occurs when applying related-art matching technology to such a group match game. Specifically, when performing the group match game using arcade game devices installed in a store or the like, a player desires to form a group with his friend who visits the store with the player and play a match against another group. According to related-art matching technology, whether the players are incorporated in the same group or the opposite groups cannot be known in advance. Moreover, the players in the same store are not necessarily incorporated in the same group.

SUMMARY

According to one aspect of the invention, there is provided a server system that performs a specific matching process based on matching requests from player terminals to form groups that simultaneously play a specific communication game, the server system comprising:

a location storage section that stores location information of each of the player terminals;

a request reception section that receives each of the matching requests by receiving a matching request signal transmitted from each of the player terminals; and a group formation section that forms the groups so that player terminals that satisfy a specific same location condition and are selected from the player terminals for which the matching request has been received by the request reception section are incorporated in a single team referring to the location information stored in the location storage section.

BRIEF DESCRIPTION OF THE SEVERAL VIEWS OF THE DRAWING

FIG. 12 is a view illustrative of a group matching condition.
FIG. 15 shows an example of a reservation state screen.
FIG. 16 shows an example of a latest vacancy state screen.
FIG. 22 shows a data configuration example of a level-ability value conversion table.
FIG. 23 shows a data configuration example of almost equal condition information.
FIG. 27 shows a data configuration example of matching information.
FIG. 30 shows a data configuration example of data recorded in a game card.
FIG. 31 shows a data configuration example of play assignment information.
FIG. 41 shows an example of a reservation state screen according to a modification.
FIG. 42 shows an example of a vacancy state screen according to a modification.

DETAILED DESCRIPTION OF THE EMBODIMENT

Figure 1:
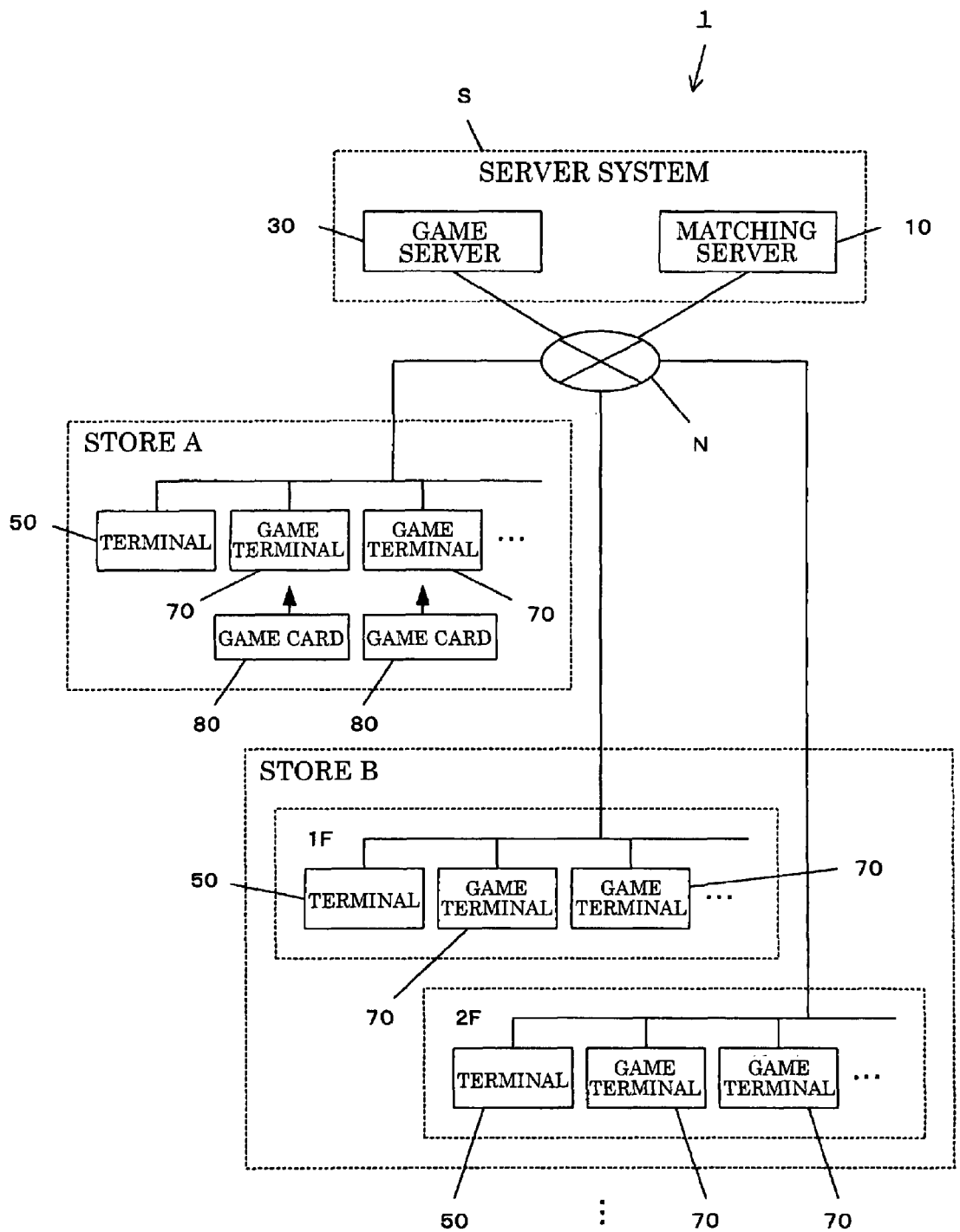
FIG. 1 is a configuration diagram showing a game system.

The invention may implement matching in which groups are formed depending on the location of each game terminal.

According to one embodiment of the invention, there is provided a server system that performs a specific matching process based on matching requests from player terminals to form groups that simultaneously play a specific communication game, the server system comprising:

a location storage section that stores location information of each of the player terminals;

a request reception section that receives each of the matching requests by receiving a matching request signal transmitted from each of the player terminals; and a group formation section that forms the groups so that player terminals that satisfy a specific same location condition and are selected from the player terminals for which the matching request has been received by the request reception section are incorporated in a single team referring to the location information stored in the location storage section.

According to another embodiment of the invention, there is provided a method that allows a server system to perform a specific matching process based on matching requests from player terminals to form groups that simultaneously play a specific communication game, the method comprising:

receiving each of the matching requests by receiving a matching request signal transmitted from each of the player terminals; and forming the groups so that player terminals that satisfy a specific same location condition and are selected from the player terminals for which the matching request has been received are incorporated in a single group referring to location information stored in a location storage section that stores the location information of each of the player terminals.

According to this configuration, the server system performs the matching process to form the groups that simultaneously play a specific communication game, and the groups are formed so that player terminals that satisfy the specific same location condition and are selected from the player terminals for which the matching request has been received are incorporated in a single team referring to the stored location information of each player terminal. Specifically, the groups are formed so that player terminals that satisfy the specific same location condition are incorporated in a single team. For example, when the same location condition is a condition whereby the player terminals are located in the same store, the groups are formed so that the players of the same store are necessarily incorporated in the same team. This enables friends visiting a store to enjoy a game in the same group, for example.

In the server system according to this embodiment, the group formation section may include a local formation section that forms local groups of player terminals that satisfy the same location condition and are selected from the player terminals for which the matching request has been received by the request reception section, the group formation section may form the groups by combining the local groups formed by the local formation section.

According to this configuration, the local groups are formed of player terminals that satisfy the same location condition and are selected from the player terminals for which the matching request has been received, and the groups are formed by combining the local groups formed.

In the server system according to this embodiment, the local formation section may form the local groups by combining player terminals that satisfy the same location condition and are selected from the player terminals for which the matching request has been received by the request reception section within a specific time from the time at which the matching request reception section received a first matching request, and then may close the formation of the local groups of the player terminals that satisfy the same location condition; and the group formation section may form the groups by combining the local groups that have been formed by the local formation section before the local formation section has closed the formation of the local groups.

According to this configuration, the local groups are formed by combining player terminals that satisfy the same location condition and are selected from the player terminals for which the matching request has been received within a specific time from the time at which the matching request reception section received the first matching request, and the formation of the local groups of the player terminals that satisfy the same location condition is then closed. The groups are formed by combining the local groups that have been formed before the formation of the local groups is closed. Specifically, since the time limit is provided for reception of the matching request from the player terminal, the groups can be promptly formed without requiring the player to wait for a long time.

In the server system according to this embodiment, the group formation section may combine the local groups so that the number of players of each of the groups approaches an optimum number of group-forming players specified in advance.

According to this configuration, the groups are formed by combining the local groups so that the number of players of each group approaches the optimum number of group-forming players specified in advance. Specifically, the groups are formed so that the number of players of each group is almost the same. For example, when the optimum number of group-forming players is set at a number equal to the maximum number of player terminals satisfying the same location condition, one group is formed of these player terminals when the players simultaneously play a game using all of the player terminals satisfying the same location condition. When the optimum number of group-forming players is set at a number equal to or larger than the maximum number of player terminals satisfying the same location condition, a situation can be prevented in which player terminals satisfying the same location condition are incorporated in different groups (i.e., players visiting a store together are incorporated in different groups).

In the server system according to this embodiment, the request reception section may receive level value identification information that can specify a play level value of a player of each of the player terminals together with the matching request signal; and the group formation section may form the groups by combining the local groups that are formed by the local formation section and have a total level value that satisfies a specific almost equal condition based on the received level value identification information.

According to this configuration, the groups are formed by combining the local groups having a total level value that satisfies a specific almost equal condition based on the level value identification information received from the player terminal together with the matching request signal. Specifically, the groups are formed by combining the local groups having almost equal total level values. This prevents a situation in which the difference in level value between the players forming one group increases to a large extent.

In the server system according to this embodiment, the request reception section may receive team identification information that can specify each of teams set in advance to which a player of each of the player terminals belongs together with the matching request signal; and the group formation section may form the groups by combining the player terminals that belong to the same team based on the received team identification information.

According to this configuration, a single group is formed of the player terminals belonging to the same team based on the group identification information received from the player terminal together with the matching request signal. Specifically, the groups are formed of the player terminals that satisfy the same location condition and used by the players belonging to the same team.

In the server system according to this embodiment, the communication game may be a game in which groups of different teams play a match; and the server system may include a match group determination section that determines the groups that play a match by selecting groups of different teams from the groups formed by the group formation section.

According to this configuration, the communication game is a game in which groups of different teams play a match, and the groups that play a match are determined by selecting the groups of different teams from the groups formed.

In the server system according to this embodiment, the match group determination section may select the groups that play a match referring to the location information stored in the location storage section so that groups including the player terminals that satisfy the same location condition do not play a match.

According to this configuration, the groups that play a match are selected so that the groups including the player terminals that satisfy the same location condition do not play a match. Specifically, the groups that play a match do not include the player terminals that satisfy the same location condition. This prevents a situation in which the players in the same store play a match (in-store match), for example.

In the server system according to this embodiment, the server system may further include a supplementation section, when the groups that play a match determined by the match group determination section differ in numbers of players, the supplementation section supplementing a computer-controlled player to at least the group of which the number of players is smaller so that the numbers of players of the groups become equal.

According to this configuration, when the determined groups differ in the number of players, the computer-controlled player is added to at least the group of which the number of players is smaller so that the numbers of players become equal. Therefore, even if the number of player terminals from which the matching request has been received is small and the groups of which the number of players is the same cannot be formed, a match between the groups of which the number of players is the same can be reliably realized by adding the computer-controlled player, for example.

In the server system according to this embodiment, the match group determination section may determine the groups that play a match so that the difference in number of players between the groups becomes smaller.

According to this configuration, the groups that play a match are determined so that the difference in number of players between the groups becomes smaller. Specifically, a match between the groups of which the numbers of players are as close as possible can be realized.

In the server system according to this embodiment, the request reception section may receive level value identification information that can specify a play level value of a player of each of the player terminals together with the matching request signal; and the match group determination section may determine the groups that play a match so that groups having a total level value that satisfies a specific match allowable level difference condition play a match based on the received level value identification information.

According to this configuration, the groups that play a match are determined so that groups having a total level value that satisfies a specific match allowable level difference condition play a match based on the level value identification information received together with the matching request signal. This realizes a match between the groups of which the levels are as close as possible.

According to a further embodiment of the invention, there is provided a schedule management device that is installed in a place in which player terminals that are connected with the above server system via a communication link and satisfy the same location condition are installed, the schedule management device being connected with the player terminals to communicate therewith, the schedule management device comprising:

a reservation setting section that sets a scheduled time of game play using each of the player terminals connected with the schedule management device and player identification information based on an operation input of a player to reserve game play at the set scheduled time;

an acquisition section that acquires, from each of the player terminals connected with the schedule management device, the player identification information input to each of the player terminals based on an operation input of a player performed when playing a game using each of the player terminals;

a reservation check section that checks a present time, the acquired player identification information, and the reservations set in the reservation setting section to determine whether or not a corresponding reservation exists; and a game execution permission control section that permits game play using each of the player terminals to which the acquired player identification information has been input when the reservation check section has determined that the corresponding reservation exists.

According to a further embodiment of the invention, there is provided a method for a schedule management device that is installed in a place in which player terminals that are connected with the above server system via a communication link and satisfy the same location condition among are installed, the schedule management device being connected with the player terminals to communicate therewith, the method comprising:

setting a scheduled time of game play using each of the player terminals connected with the schedule management device and player identification information based on an operation input of a player to reserve game play at the set scheduled time;

acquiring, from each of the player terminals connected with the schedule management device, the player identification information input to each of the player terminals based on an operation input of a player performed when playing a game using each of the player terminals;

checking a present time, the acquired player identification information, and the reservations to determine whether or not a corresponding reservation exists; and permitting game play using each of the player terminals to which the acquired player identification information has been input when the corresponding reservation exists as a result of the determination.

According to this configuration, the schedule management device is installed in a place in which the player terminals that satisfy the same location condition are installed and is connected with the player terminals to communicate therewith, and game play at the scheduled time is reserved by setting the scheduled time of game play using the player terminal connected with the schedule management device and the player identification information. The acquired player identification information and the set reservations are checked to determine whether or not the corresponding reservation exists, and game play using the player terminal is permitted when the corresponding reservation exists. Specifically, an advance reservation game play is realized in which game play reserved in advance using the schedule management device can be reliably performed using each game terminal. The player can necessarily play a game at the reserved scheduled time without standing by.

In the schedule management device according to this embodiment, the communication game may be a game in which groups of different teams play a match; and the reservation setting section may set a reservation of a player based on an operation input of the player in a reservable time zone corresponding to a team specified based on the operation input, the reservable time zone being specified in advance in units of the teams.

According to this configuration, the communication game is a game in which groups of different teams play a match, and the reservation of the player is set in the reservable time zone corresponding to a team specified based on the operation input, the reservable time zone being specified in advance in units of the teams.

According to a further embodiment of the invention, there is provided a schedule management device that is installed in a place in which player terminals that are connected with the above server system via a communication link and satisfy the same location condition are installed, the schedule management device being connected with the player terminals to communicate therewith, the schedule management device comprising:

a reservation setting section that sets a play order number of game play using each of the player terminals connected with the schedule management device and player identification information to reserve game play of the set play order number;

a play number count section that counts a present play order number based on game execution using each of the player terminals connected with the schedule management device;

an acquisition section that acquires, from each of the player terminals connected with the schedule management device, the player identification information input to each of the player terminals based on an operation input of a player performed when playing a game using each of the player terminals;

a reservation check section that checks the play order number counted by the play number count section, the acquired player identification information, and the reservations set in the reservation setting section to determine whether or not a corresponding reservation exists; and a game execution permission control section that permits game play using each of the player terminals to which the acquired player identification information has been input when the reservation check section has determined that the corresponding reservation exists.

According to this configuration, the schedule management device is installed in a place in which the player terminals that satisfy the same location condition are installed and is connected with the player terminals to communicate therewith, and game play of the play order number is reserved by setting the play order number of game play using the player terminal connected with the schedule management device and the player identification information. The present play order number, the player identification information acquired from the player terminal, and the set reservations are checked to determine whether or not the corresponding reservation exists, and game play using the player terminal is permitted when the corresponding reservation exists. Specifically, an advance reservation game play is realized in which game play reserved in advance using the schedule management device can be reliably performed using each game terminal. The player can necessarily play a game of the reserved play order number without standing by.

In the schedule management device according to this embodiment, the communication game may be a game in which groups of different teams play a match; and the reservation setting section may set the play order number in units of the teams and may set the play order number corresponding to a team specified based on an operation input of a player while associating the play order number with the player identification information of the player to set reservation of the player based on the operation input of the player.

According to this configuration, the communication game is a game in which groups of different teams play a match, the play order number is set in team units, and the reservation of the player is set for the play order number corresponding to the team specified based on the operation input of the player.

In the schedule management device according to this embodiment, the schedule management device may include a reservation display control section that displays the reservations set in the reservation setting section according to a scheduled game play order.

According to this configuration, the set reservations are displayed in the schedule game play order. This enables the player to easily determine the reservable date or play order number from the displayed present reservation state and promptly make a reservation.

In the schedule management device according to this embodiment, the schedule management device may include:

a terminal assignment section that assigns each of the player terminals connected with the schedule management device to a corresponding reservation set in the reservation setting section; and a near reservation display control section that displays a reservation for at least next game play among the reservations set in the reservation setting section together with identification information of the player terminal assigned to the corresponding reservation by the terminal assignment section.

According to this configuration, the player terminal selected from the player terminals connected with the schedule management device is assigned to the corresponding reservation, and the reservation for at least the next game play among the reservations set is displayed together with the identification information of the player terminal assigned to the corresponding reservation. Specifically, the next reservation is shown by displaying the reservation for the next game play together with the identification information of the corresponding player terminal. This prompts the player to reliably perform the reserved game play.

According to the invention, the server system performs the matching process to form the groups that simultaneously play a specific communication game, and the groups are formed so that player terminals that satisfy the specific same location condition and are selected from the player terminals for which the matching request has been received are incorporated in a single team referring to the stored location information of each player terminal. Specifically, the groups are formed so that player terminals that satisfy the specific same location condition are incorporated in a single team. For example, when the same location condition is a condition whereby the player terminals are located in the same store, the groups are formed so that the players of the same store are necessarily incorporated in the same team. This enables friends visiting a store to enjoy a game in the same group, for example.

Preferred embodiments of the invention are described below with reference to the drawings. The following description illustrates the case of applying the invention to a game system which executes an online match game. Note that the embodiments to which the invention can be applied are not limited thereto.

System Configuration

FIG. 1 is a configuration diagram of a game system 1 according to this embodiment. As shown in FIG. 1, the game system 1 is configured by connecting a matching server 10 and a game server 30 which make up a server system S, terminals 50, and game terminals 70 with a communication line N. The terminal 50 and the game terminal 70 are installed in each store such as an amusement facility over the whole country. Specifically, one terminal 50 and two or more game terminals 70 are installed in each play area such as a store or the floor (e.g., first floor or second floor) of a store, and the terminal 50 and the game terminals 70 installed in the same play area are connected via a LAN or the like provided in that play area. The following description illustrates an example in which the maximum number of game terminals 70 installed in the same play area is eight for convenience of illustration.

The term "communication line N" used herein means a communication channel through which data can be exchanged. Specifically, the term "communication line N" includes a communication network such as a LAN using a private line (private cable) for direct connection, Ethernet (registered trademark), and the like, a telecommunication network, a cable network, and the Internet. The communication method may be a cable communication method or a wireless communication method.

The matching server 10 is formed using a known server system including a processor which executes various processes, a storage device which stores various programs, data, and the like, a communication device which connects with the communication line N, and the like. The matching server 10 may include two or more server computers. The matching server 10 is installed in a game service provider, for example, and performs a matching process of combining game terminals 70 which play a match from the game terminal 70 connected with the matching server 10.

The game server 30 is formed using a known server system including a processor which executes various processes, a storage device which stores various programs, data, and the like, a communication device which connects with the communication line N, and the like. The game server 30 may include two or more server computers. Or, the game server 30 and the matching server 10 may be formed using one server system. The game server 30 is installed in a game service provider, for example, and controls a communication game performed using the game terminals 70 matched by the matching server 10.

The terminal 50 is a schedule management device which manages reservations (schedule) for game play using each game terminal 70 installed in the same play area as the terminal 50. Specifically, the terminal 50 receives reservation for game play from a player, and manages execution of game play using each game terminal 70 in the same play area according to the received reservation.

The game terminal 70 is a game device (player terminal) for a player to play a game. The game terminal 70 is implemented by an arcade game device, for example. The game terminal 70 performs a network game process of playing a match against other game terminals 70 based on the results of the matching process performed by the matching server 10.

Installation Example in Store

Figure 2:
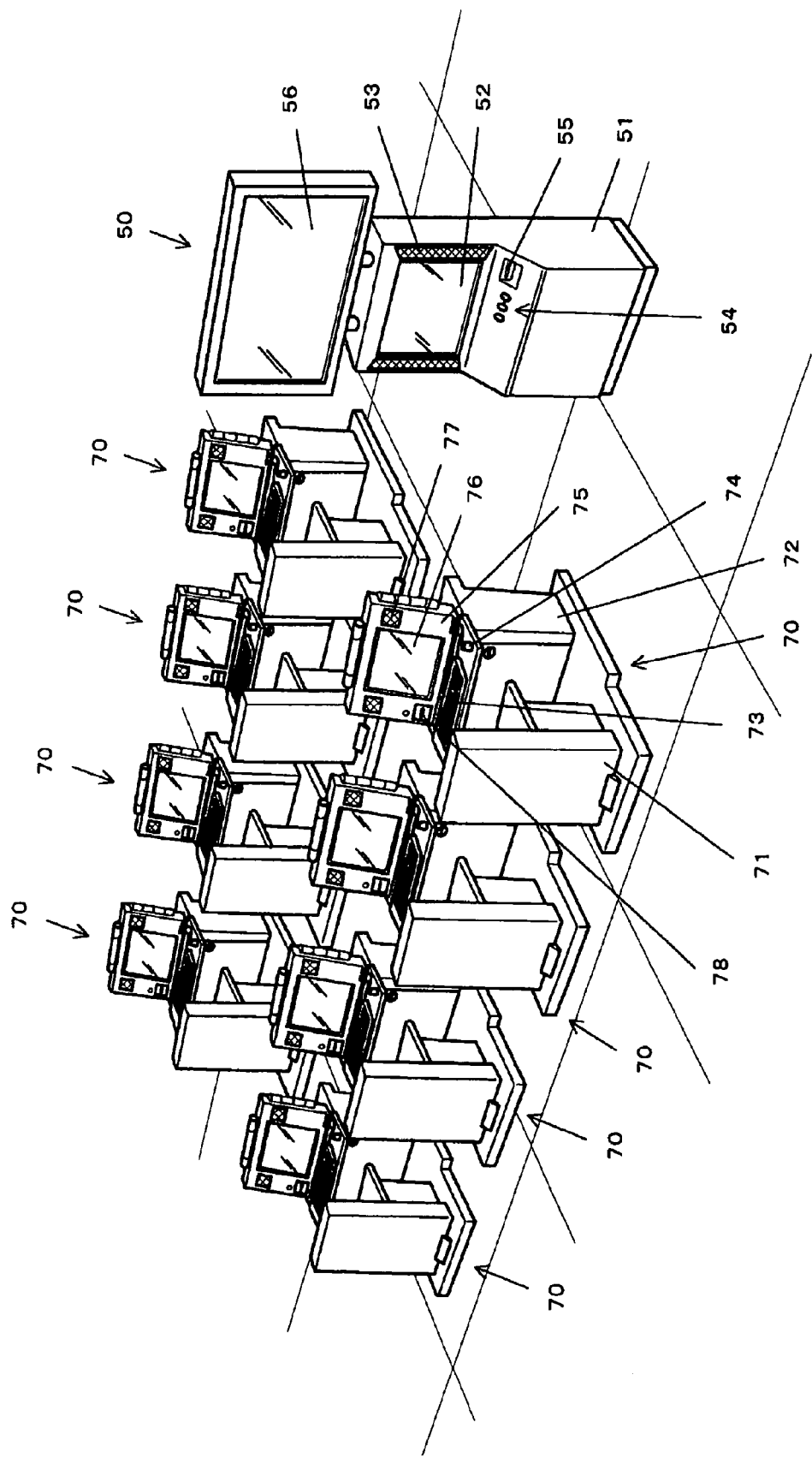
FIG. 2 shows an example of an installation state of a terminal and game terminals in a store.

FIG. 2 is a view showing an example of an installation state of the terminal 50 and the game terminals 70 in a store as one play area. As shown in FIG. 2, one terminal 50 and a specific number of (i.e., eight) game terminals 70 are installed in the store.

The terminal 50 is configured to include a main body 51 and a large screen 56 which is disposed on the upper side of the main body 51 and displays a demonstration image, a next play guide screen, and the like. The terminal 50 is installed at a visible position in the store, for example. A display 52 which displays a game play reservation screen and the like is provided on the upper front surface of the main body 51. A speaker 53 which outputs various types of sound conforming to the display screen of the display 52 is provided on each side of the display 52. Operation buttons 54 operated by a player and a card insertion slot 55 in which a game card 80 is inserted are provided under the display 52. A player purchases the game card 80 in advance, for example. The game card 80 is implemented by an IC card including a contact-type IC chip (e.g., mu-chip) in which data such as a specific card ID is recorded.

The main body 51 includes a system board on which a CPU, an image generation IC, a sound generation IC, and the like are mounted. The CPU executes a reservation management process based on a program and data read from a memory provided on the system board, data read from the game card 80 inserted into the card insertion slot 55, an operation signal input from the operation button 54, and the like.

The game terminal 70 includes a chair 71 and a console 72. A keyboard 73 and a mouse 74 with which a player inputs a game operation is disposed on the console 72. A display panel 75 which includes a display 76 which displays a game screen on its front surface is also disposed on the console 72. A touch panel is integrally formed in the display 76 over the entire display area. The touch panel detects a touch position in units of dots forming the display 76 according to a detection principle such as a pressure-sensitive method, an optical method, an electrostatic method, or an electromagnetic induction method, for example. A player can input various operation inputs by utilizing a touch pen provided as an accessory, or by touching the display 76.

A speaker 77 which outputs game sound such as effect sound and background music (BGM) is disposed on each side of the upper portion of the front surface of the display panel 75. A card reader 78 which reads data recorded in the game card 80 inserted therein is disposed in the lower left portion of the front surface of the display panel 75.

The console 72 includes a system board on which a CPU, an image generation IC, a sound generation IC, and the like are mounted. The CPU executes the online match game according to this embodiment based on a program and data read from a memory provided on the system board, data read from the game card 80 using the card reader 78, an operation signal input from the keyboard 73 and the mouse 74, and the like.

Outline of Game

The communication game executed in the game system 1 according to this embodiment is a match game in which groups of players play a match. Specifically, each player belongs to one of teams (i.e., team A and team B) determined in advance. The team to which each player belongs is fixed and is recorded in the game card 80 possessed by the player.

Each group is formed so that players who belong to the same team and play a game using the game terminals 70 in the same play area belong to the same group. Each group is formed so that the number of players forming each group is four or more and eight or less. Specifically, each group is formed so that the number of players forming each group becomes eight (optimum number of players forming each group) as much as possible. The optimum number of players forming each group may be appropriately set depending on the type of game and the like. In this embodiment, the optimum number of players forming each group is set at the number of players equal to the maximum number of game terminals 70 installed in the play area (i.e., eight) so that all players in the same play area are included in the same group.

The groups which play a match are determined so that groups of different teams play a match. Specifically, the groups are matched so that a group of players belonging to the team A (group of the team A) plays a match against a group of players belonging to the team B (group of the team B). In this case, the groups are matched so that players in the same play area are not included in different groups. This aims at preventing a situation in which players in the same play area do not play a match.

The groups are matched so that the number of players of each group is the same. Specifically, the groups are basically matched so that groups of which the number of players is the same play a match. When matching groups which differ in the number of players due to the absence of a player and the like, a computer-controlled player (COM player) is added to the group of which the number of players is smaller so that the number of players (the number including the COM player) of each group which play a match is necessarily made equal.

The game server 30 controls the process of the match game performed by the matched players. Specifically, operation data input by the player is transmitted to the game server 30 from each game terminal 70. The game server 30 generates an operation data group which is a set of the operation data of each player transmitted from each game terminal 70, and distributes the generated operation data group to each game terminal 70. Each game terminal 70 controls each character (including a character operated by the player) based on the operation data of each player included in the operation data group received from the game server 30.

When a COM player is included in the matched players, a character (COM character) operated by the COM player is controlled by the game server 30. Specifically, the game server 30 generates operation data of the COM character based on a specific control routine, for example, and transmits the generated operation data and the operation data received from each game terminal 70 to each game terminal 70 as the operation data group. The COM character may be controlled by each game terminal 70 based on a specific control routine specified by the game server 30, for example.

Matching Principle

A matching principle is described below. The matching process according to this embodiment is generally implemented by two-stage matching. Specifically, (1) in-store matching is performed in which a local group of players who plays using the game terminals 70 satisfying a same location condition and belong to the same team is generated, and (2) out-of-store matching is then performed in which a group of each team is generated by combining the local groups generated by in-store matching and groups of different teams are combined as opposite groups. (2) In out-of-store matching, (2a) same-team matching is performed in which local groups of the same team are combined to generate a group of players belonging to the same team, and (2b) match matching is then performed in which groups of different teams among the groups generated by same-team matching are combined as opposite groups.

The same location condition is a condition whereby the locations of the game terminals 70 are the same. Specifically, the game terminals 70 installed in the same play area are considered to be the game terminals 70 satisfying the same location condition. The play area is a store or each floor of a store, as described above. The following description is given on the assumption that the play area is a store for convenience of illustration.

Figure 3:
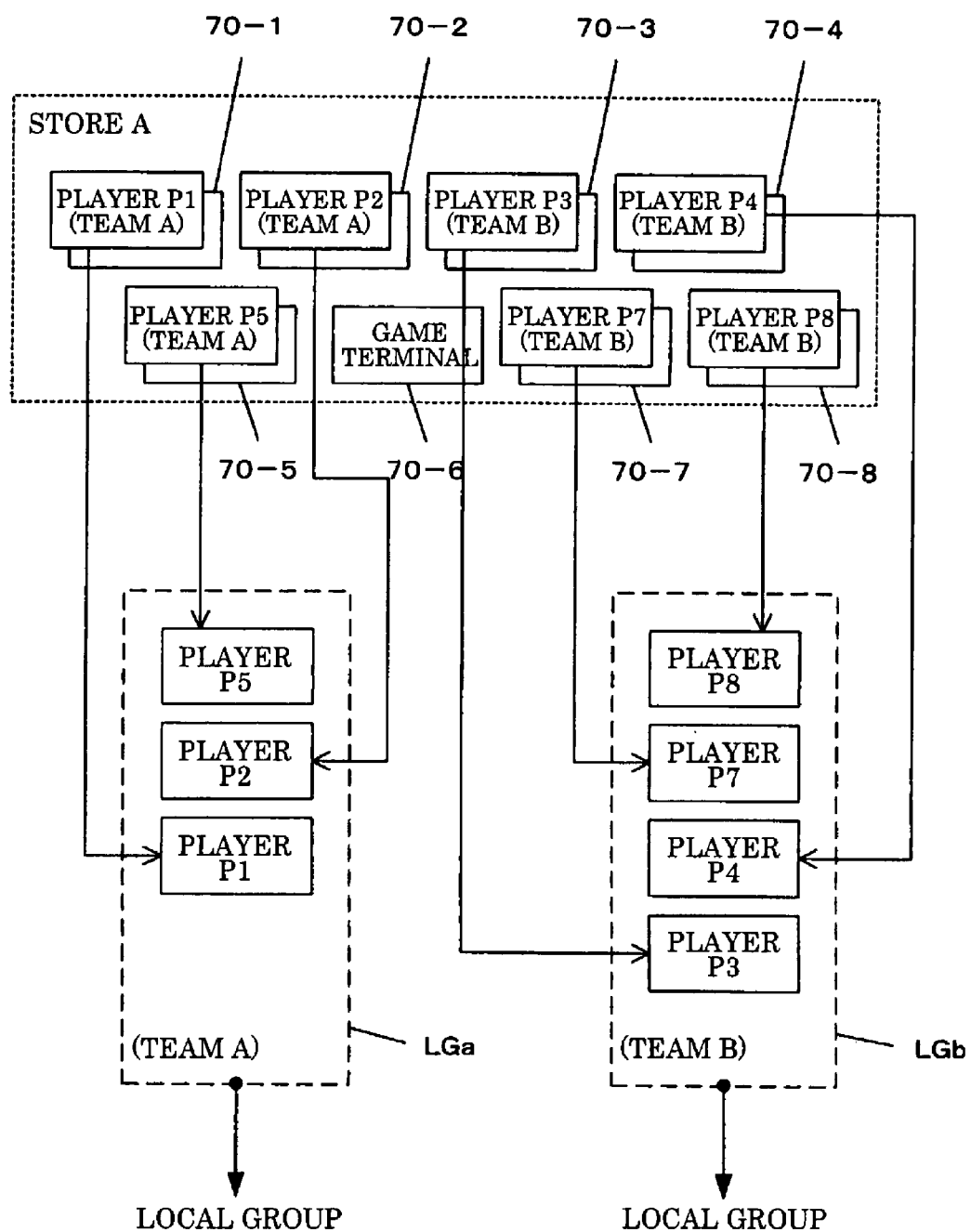
FIG. 3 is a view illustrative of in-store matching.

FIG. 3 is a view illustrative of in-store matching. FIG. 3 shows an example of the store A. Eight game terminals 70-1 to 70-8 are installed in the store A so that eight players at maximum can play a game at the same time. Players are playing a game using seven game terminals 70-1 to 70-5, 70-7, and 70-8. These players belong to the team A or the team B. Specifically, players P1, P2, and P5 belong to the team A, and players P3, P4, P7, and P8 belong to the team B.

In in-store matching, a local group LG of the players P belonging to each team is generated. In FIG. 3, a local group LGa of the players P1, P2, and P5 belonging to the team A and a local group LGb of the players P3, P4, P7, and P8 belonging to the team B are generated. A local group LG of each team is similarly generated in other stores. Out-of-store matching is performed based on the local groups LG generated in units of stores and teams.

Figure 4:
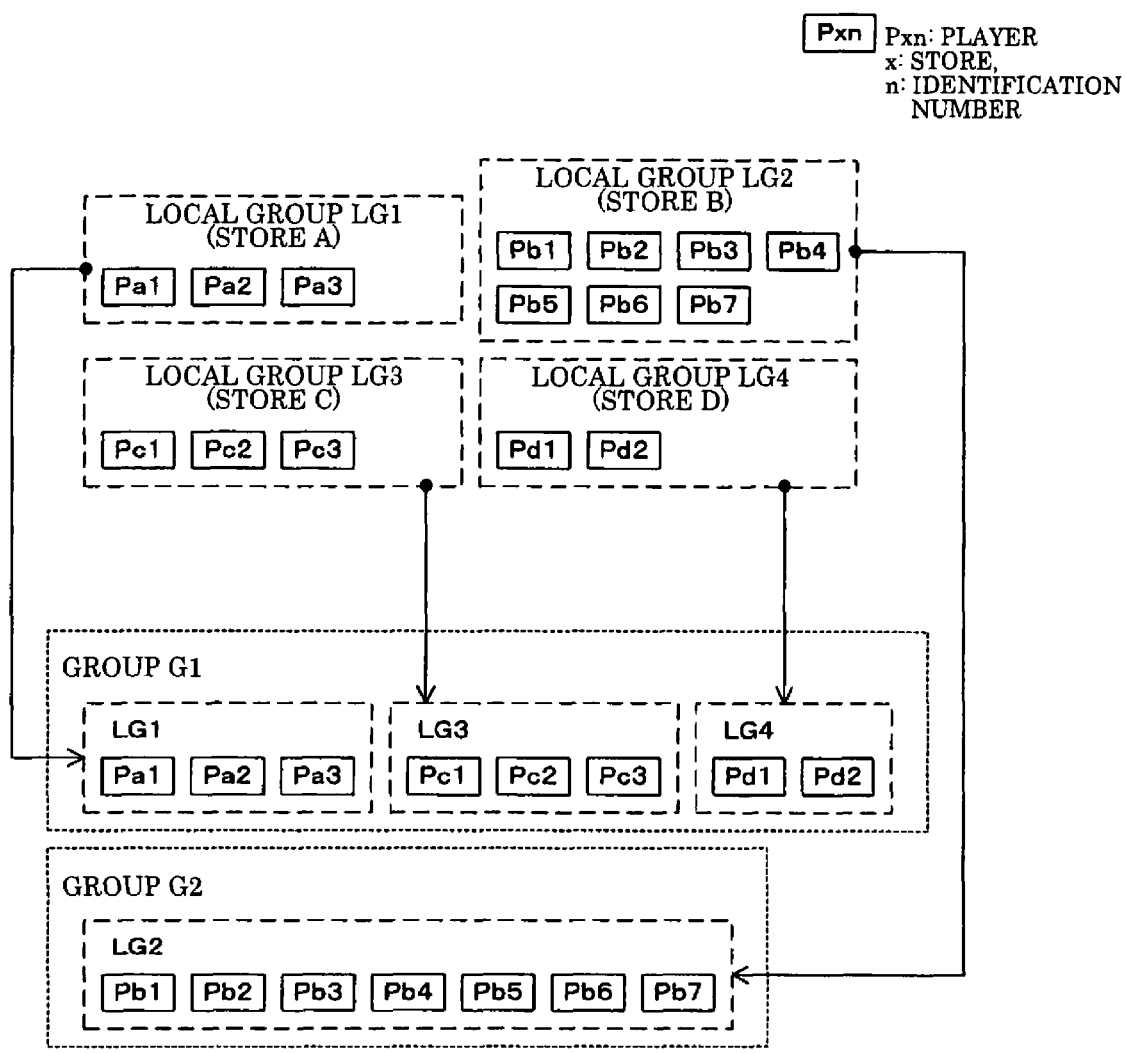
FIG. 4 is a view illustrative of same-team matching.

In out-of-store matching, same-team matching is performed in which the local groups LG generated in the respective stores are combined to form a group G as shown in FIG. 4. FIG. 4 is a view showing an outline of same-team matching. In same-team matching, the group G is formed by combining the local groups LG so that the number of players of each team is four or more and eight or less, as shown in FIG. 4. FIG. 4 shows one team. Two groups G1 and G2 are formed by combining local groups LG1 to LG4 of the stores A to D. Specifically, the group G1 of the local groups LG1, LG3, and LG4 and the group G2 of the local group LG2 are formed. The number of players of the group G1 is eight, and the number of players of the group G1 is seven.

Figure 5:
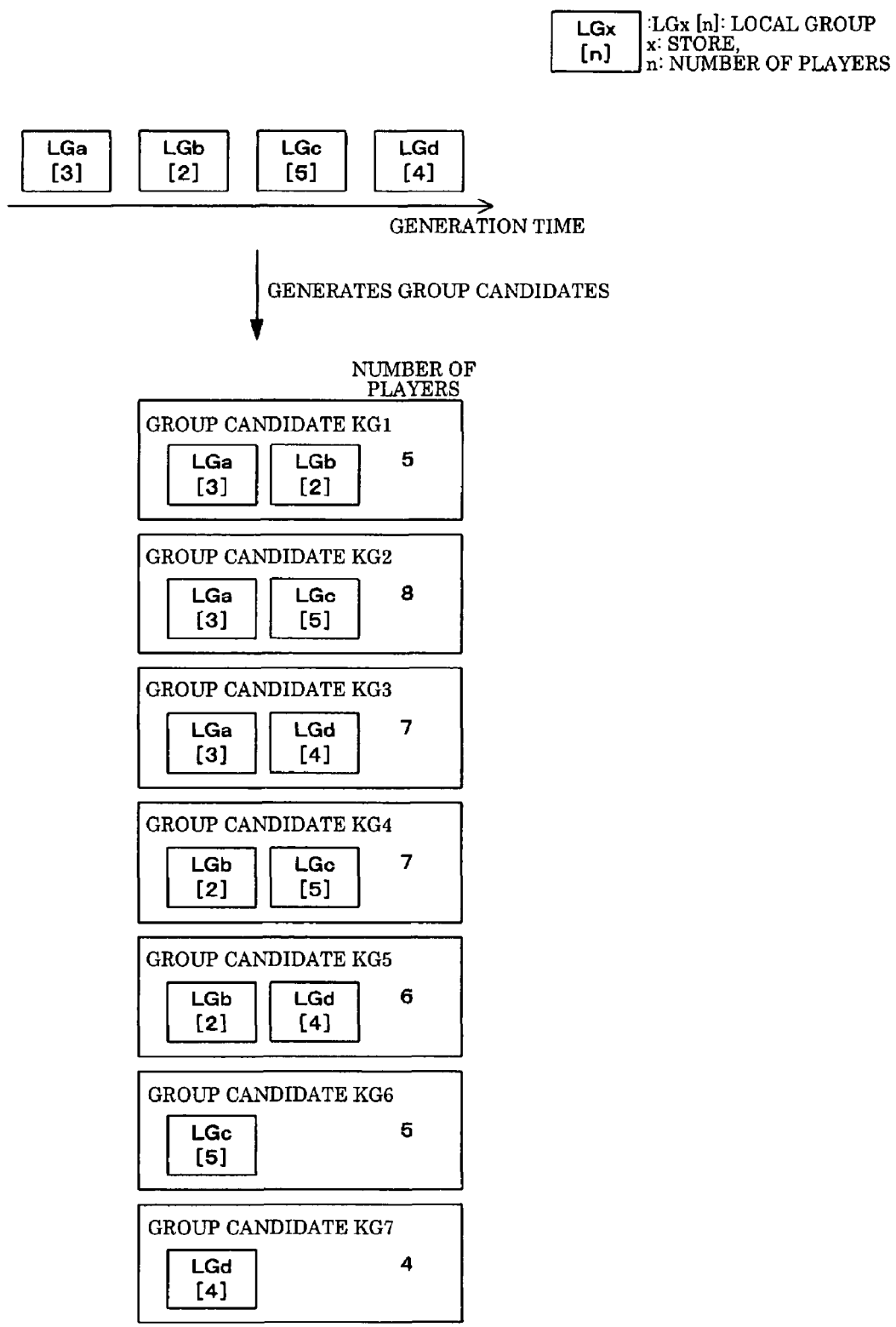
FIG. 5 is a view illustrative of group candidate generation.

In same-team matching, group candidates KG are generated by combining the local groups LG, as shown in FIG. 5. Specifically, the combinations of the local groups LG of which the number of players is four or more and eight or less among all combinations of the local groups LG are determined to be the group candidates KG. In FIG. 5, seven group candidates KG1 to KG7 are generated by combining four local groups LG1 to LG4.

A group candidate of which the average ability value (i.e., level value of each local group LG forming the group candidate) does not satisfy a specific almost equal condition is deleted from the generated group candidates KG. The almost equal condition is a condition whereby the difference in average ability value between the local groups LG is considered to be almost the same. Specifically, when the difference in average ability value between the local groups LG forming the group candidate KG exceeds a specific value (e.g., "200"), it is determined that the group candidate KG does not satisfy the almost equal condition.

Figure 6:
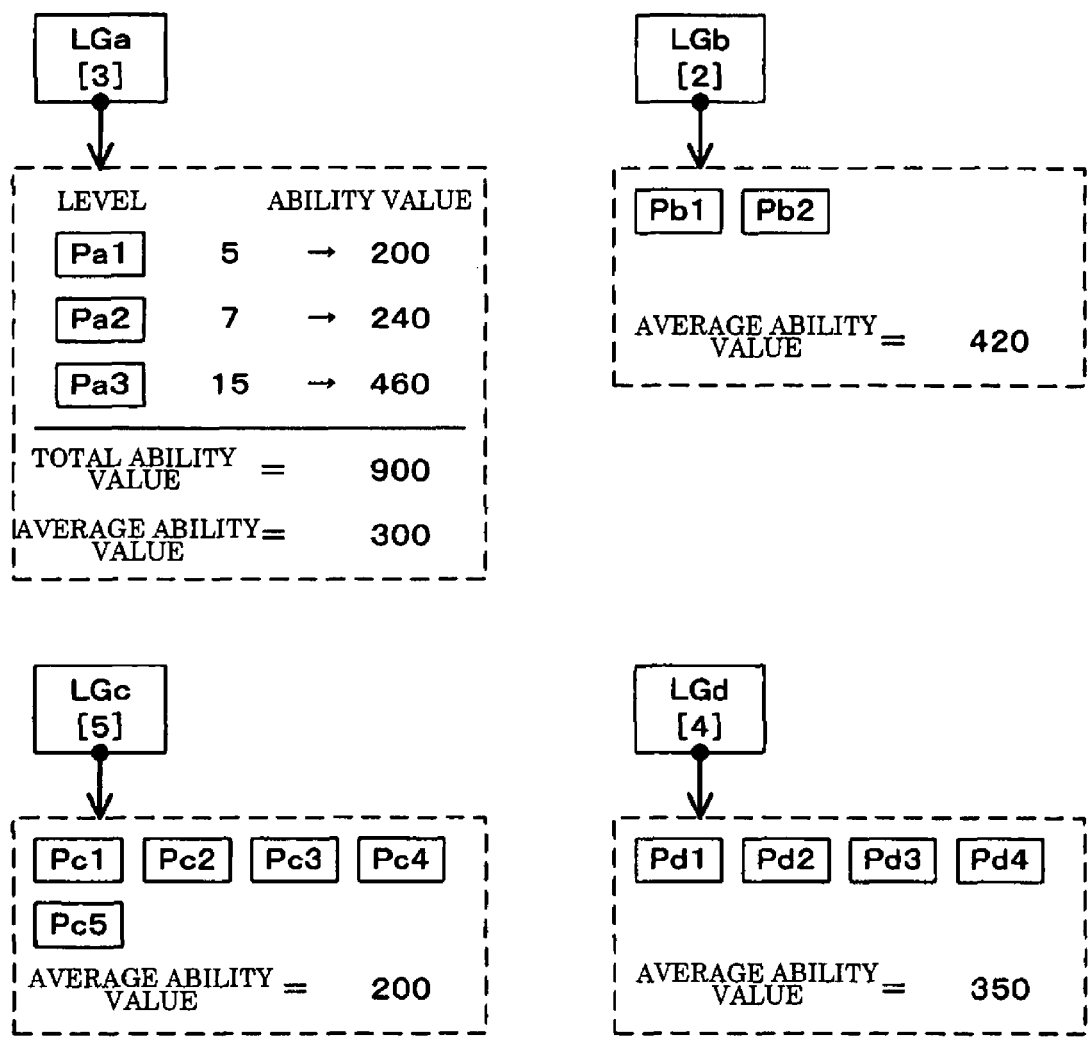
FIG. 6 is a view illustrative of calculation of an average ability value of a local group.

The average ability value of the local group LG is calculated as shown in FIG. 6. FIG. 6 is a view illustrative of calculation of the average ability value of the local group LG. As shown in FIG. 6, the level of each player P is converted into an ability value according to a specific conversion method. The total ability value (i.e., the sum of the ability values of the players forming the local group LG) of each local group LG is then calculated, and the average ability value is calculated by diving the total ability value by the number of players. In FIG. 6, the local group LGa is formed of three players Pa1 to Pa3, and the ability values obtained by converting the levels of the players Pa1 to Pa3 are respectively "200", "240", and "460". Therefore, the total ability value of the local group LGa is "900 (=200+240+460)", and the average ability value is "300 (=900/3)".

Figure 7:
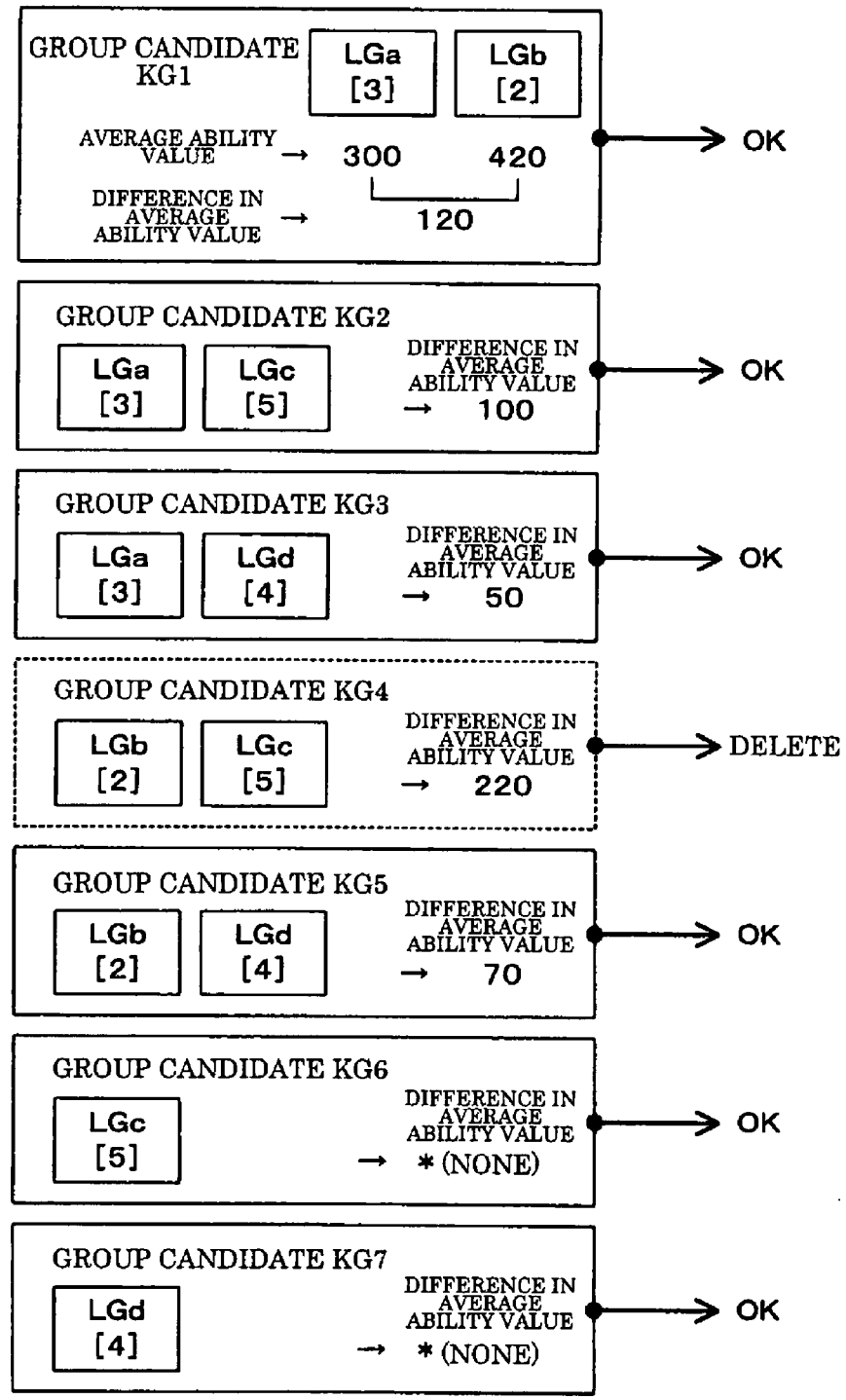
FIG. 7 is a view illustrative of calculation of the difference in average ability value between local groups.

As shown in FIG. 7, the difference in average ability value between the local groups LG forming each group candidate KG is calculated. When the calculated difference in average ability value exceeds a specific value, it is determined that the group candidate KG does not satisfy a level condition, whereby the group candidate KG is deleted. In FIG. 7, the average ability values of the local groups LGb and LGc forming the group candidate KG4 are respectively "420" and "200", as shown in FIG. 6. Therefore, since the difference in average ability value between the local groups LGb and LGc is "220 (=420−200)" and exceeds a specific value "200", it is determined that the group candidate KG4 does not satisfy the level condition, whereby the group candidate KG4 is deleted.

Since the difference in average ability value is not calculated for the group candidate KG formed of one local group LG that group candidate KG is determined to satisfy the level condition. When the group candidate KG is formed of three or more local groups LG, the difference in average ability value between the respective local groups LG is calculated. When one of the calculated differences in average ability value exceed a specific value, it is determined that the group candidate KG does not satisfy the level condition, whereby the group candidate KG is deleted.

Figure 8:
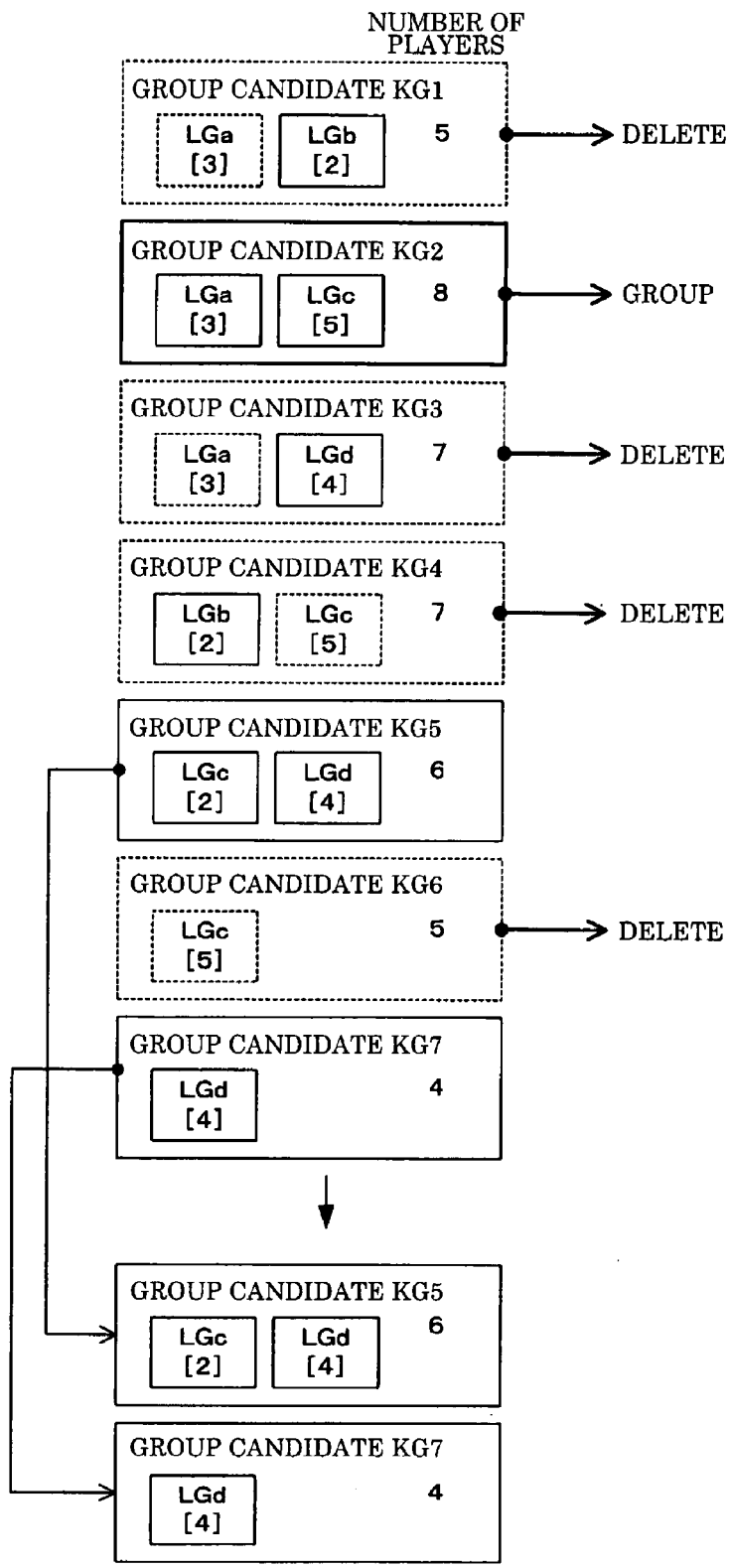
FIG. 8 is a view illustrative of group formation.

After the group candidates KG have been generated, the group candidate KG of which the number of players is eight is formed as the group G as shown in FIG. 8. Other group candidates KG including each local group LG forming the group G are deleted. In FIG. 8, since the number of players of the group candidate KG2 is eight, the group candidate KG2 is formed as the group G, for example. Other group candidates KG (i.e., group candidates KG1, KG3, KG4, and KG6) including the local groups LGa and LGc forming the group candidate KG2 are deleted.

Figure 9:
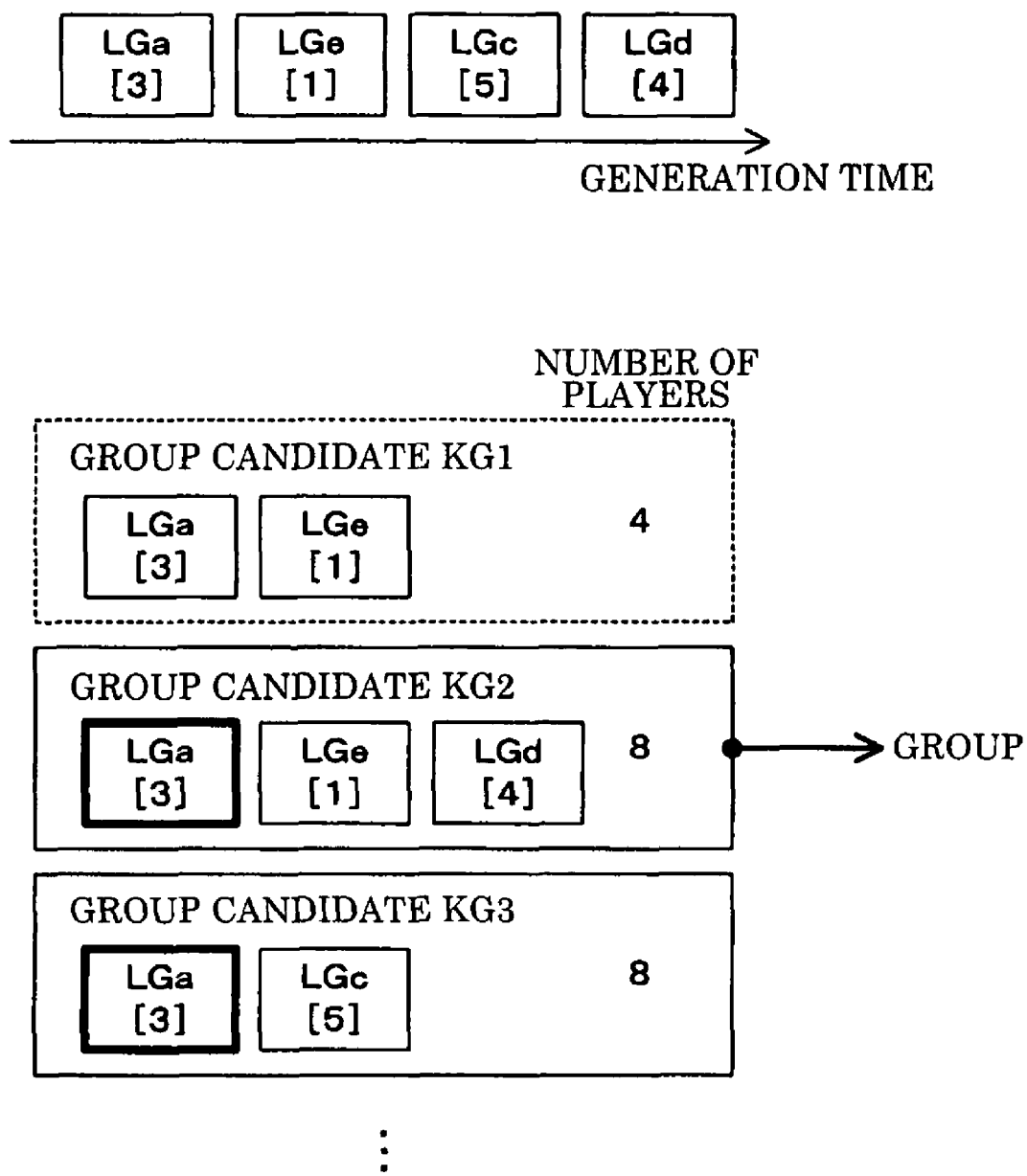
FIG. 9 is a view illustrative of order of priority of group formation.

As shown in FIG. 9, when the number of group candidates KG of which the number of players is eight and which include the same local group LG is two or more, the group candidate KG including the local group LG other than the local group LG included in these group candidates KG of which the generation time is earlier (older) is preferentially formed as the group G.

Figure 10:
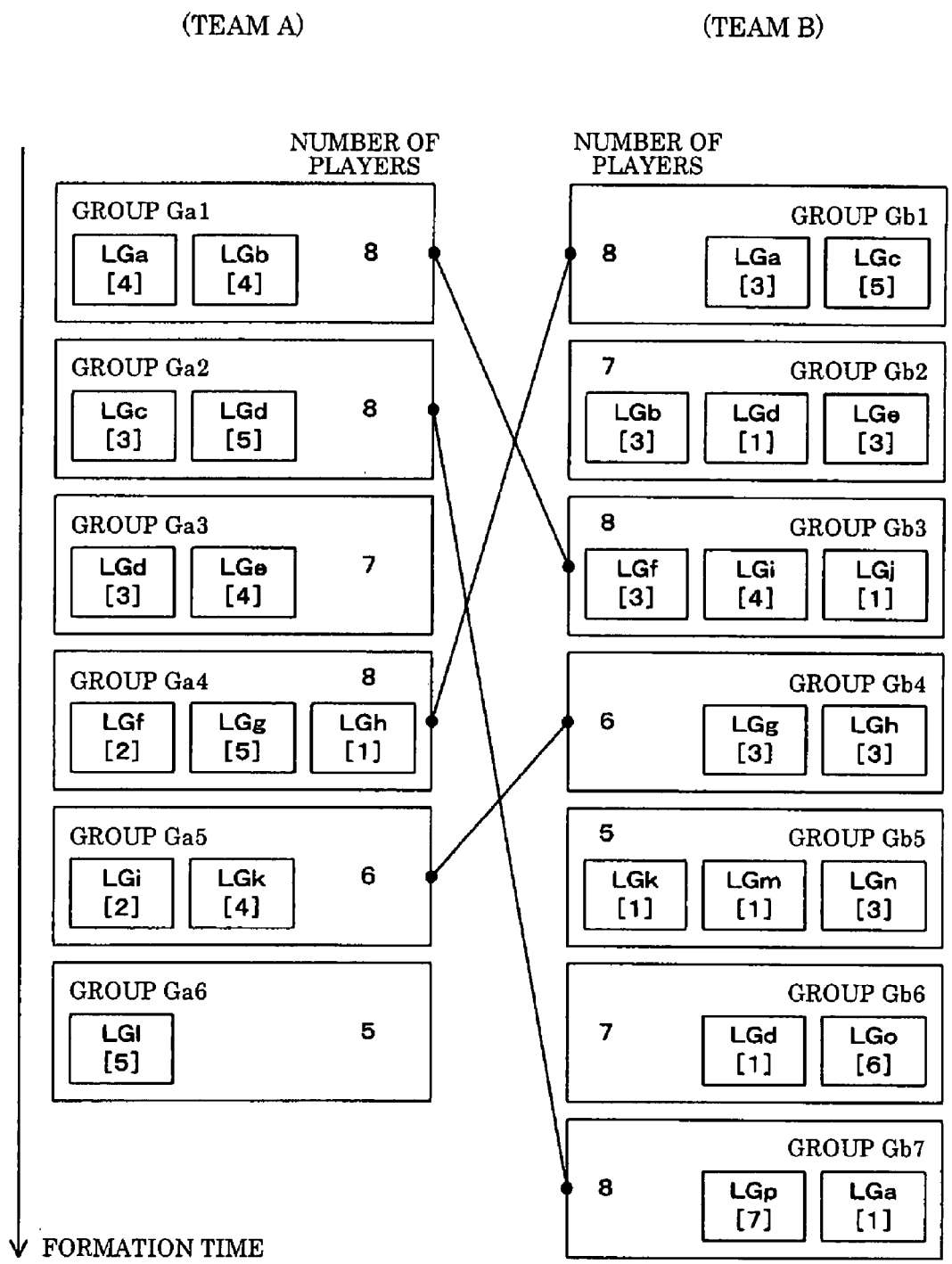
FIG. 10 is a view illustrative of match matching.

In FIG. 9, the numbers of players of the group candidates KG2 and KG3 are eight, and the group candidates KG2 and KG3 include the local group LGa, for example. Among the local groups LG forming the group candidates KG2 and KG3, the local group LG other than the local group LGa of which the generation time is the earliest (oldest) is the local group LGe in the group candidate KG2 and the local group LGc in the group candidate KG3. The generation time of the local group LGe is earlier than the generation time of the local group LGc. Therefore, the group candidate KG2 is formed as the group G Match matching is then performed in which the groups G which play a match are determined from the generated groups G. FIG. 10 is a view illustrative of match matching. FIG. 10 shows the groups Ga of the team A on the left and the groups Gb of the team B on the right in the order of formation time (where the vertical axis indicates the formation time). As shown in FIG. 10, the groups G of different teams which include the same number of players are basically matched in match matching as opposite groups. In this case, the groups of which the formation time is earlier are matched preferentially. In FIG. 10, the group Ga1 of the team A and the group Gb3 of the team B of which the number of players is eight are matched as opposite groups, and the group Ga2 of the team A and the group Gb7 of the team B of which the number of players is eight are matched as opposite groups, for example. The group Ga5 of the team A and the group Gb4 of the team B of which the number of players is six are matched as opposite groups.

Specifically, even if the groups G of different teams include the same number of players, these groups are not matched as opposite groups when a specific match condition is not satisfied. The match condition is a condition whereby two groups G are matched mutually as opposite groups. Specifically, the match condition is a condition whereby (1) the game terminals 70 of the players included in the groups G do not satisfy a specific same location condition, and (2) the total ability values (i.e., the level value of the entire group G) of the groups G satisfy a specific match allowable level difference condition. The same location condition is a condition whereby the locations of the game terminals 70 are the same, as described above. Specifically, when the players who play a game using the game terminals 70 installed in the same store are not included in the groups G, it is determined that the groups G do not satisfy the same location condition. The match allowable level difference condition is a condition relating to the difference in total ability value between the groups G. Specifically, when the difference in total ability value between the groups G exceeds a specific value (e.g., "400"), it is determined that the groups G do not satisfy the match allowable level difference condition.

Figure 11:
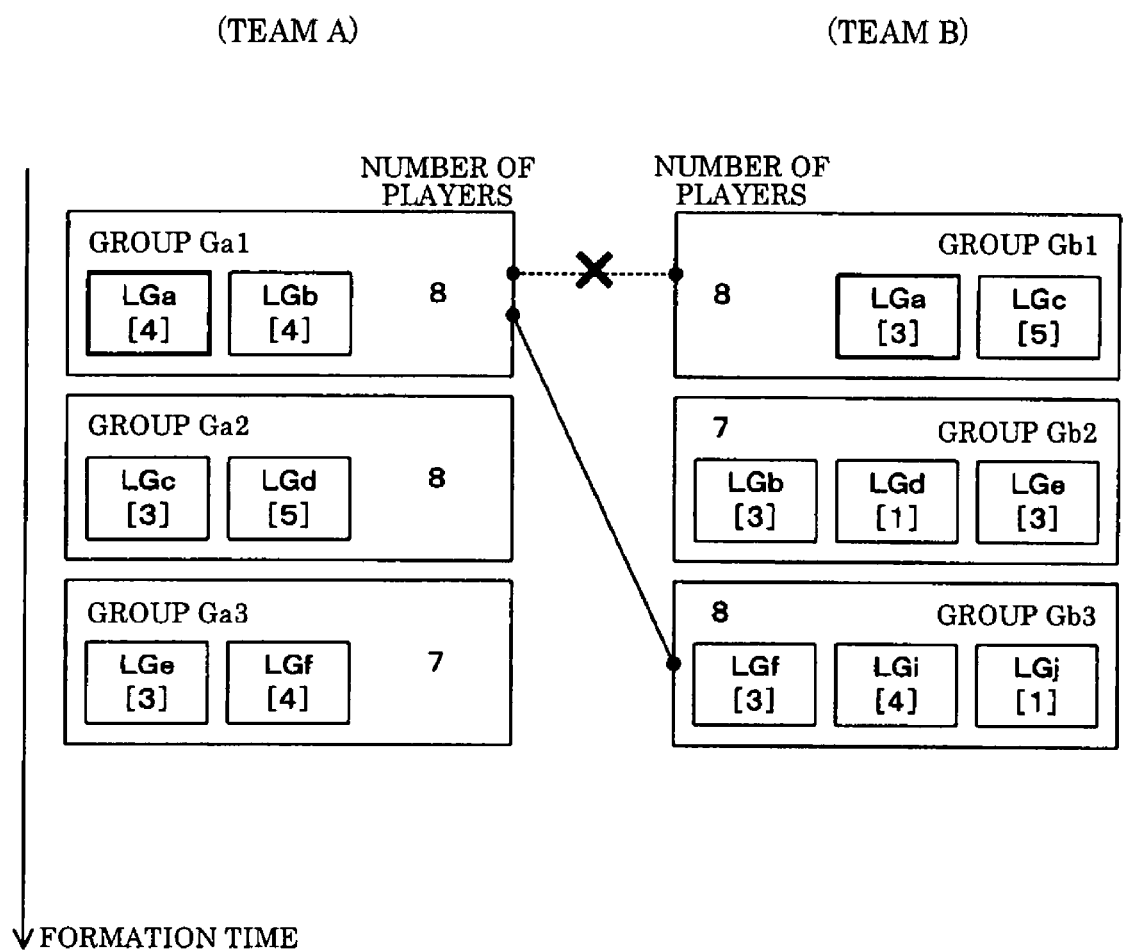
FIG. 11 is a view illustrative of a group matching condition.

FIG. 11 is a view illustrative of the match condition (1). FIG. 11 shows the groups Ga of the team A on the left and the groups Gb of the team B on the right in the order of formation time (where the vertical axis indicates the formation time). In FIG. 11, the numbers of players of the group Ga1 of the team A and the groups Gb1 and Gb3 of the team B are eight. On the other hand, the groups Ga1 and Gb1 include the local group LGa of the store A. Specifically, the groups Ga1 and Gb1 include the game terminals 70 which satisfy the same location condition. Specifically, the combination of the groups Ga1 and Gb1 does not satisfy the match condition (1). The local group LGa included in the group Ga1 and the local group LGa included in the group Gb1 are formed of different players P. Specifically, the local group LGa included in the group Ga1 is formed of the players P of the store A belonging to the team A, and the local group LGa included in the group Gb1 is formed of the players P of the store A belonging to the team B. On the other hand, the groups Ga1 and Gb3 do not include the local group LG of the same store. Specifically, the groups Ga1 and Gb3 do not include the game terminals 70 which satisfy the same location condition. Specifically, the combination of the groups Ga1 and Gb3 satisfies the match condition (1). Therefore, the group Ga1 of the team A and the group Gb3 of the team B may be matched as opposite groups.

FIG. 12 is a view illustrative of the match condition (2). As shown in FIG. 12, the sum of the total ability values of the local groups LG forming each group G is calculated, and the difference in total ability value between the groups G of different teams is then calculated.

In FIG. 12, the group Ga1 of the team A is formed of the local groups LGa and LGb, and the total ability values of the local groups LGa and LGb are respectively "400" and "410". Specifically, the total ability value of the group Ga1 is "810 (=400+410)". The group Gb1 of the team B is formed of the local groups LGc and LGd, and the total ability values of the local groups LGc and LGd are respectively "520" and "710". Specifically, the total ability value of the group Gb1 is "1230 (=520+710)". Therefore, the difference in total ability value between the groups Ga1 and Gb1 is "420 (=1230−810)" and exceeds a specific value "400". Therefore, the groups Ga1 and Gb1 do not satisfy the match condition (2).

On the other hand, the total ability value of the group Gb3 is "1020". Therefore, the difference in total ability value between the groups Ga1 and Gb3 is "210 (=1020−810)", which does not exceed a specific value "400". Specifically, the groups Ga1 and Gb3 satisfy the match condition (2). Therefore, the group Ga1 of the team A and the group Gb3 of the team B may be matched as opposite groups.

Figure 13:
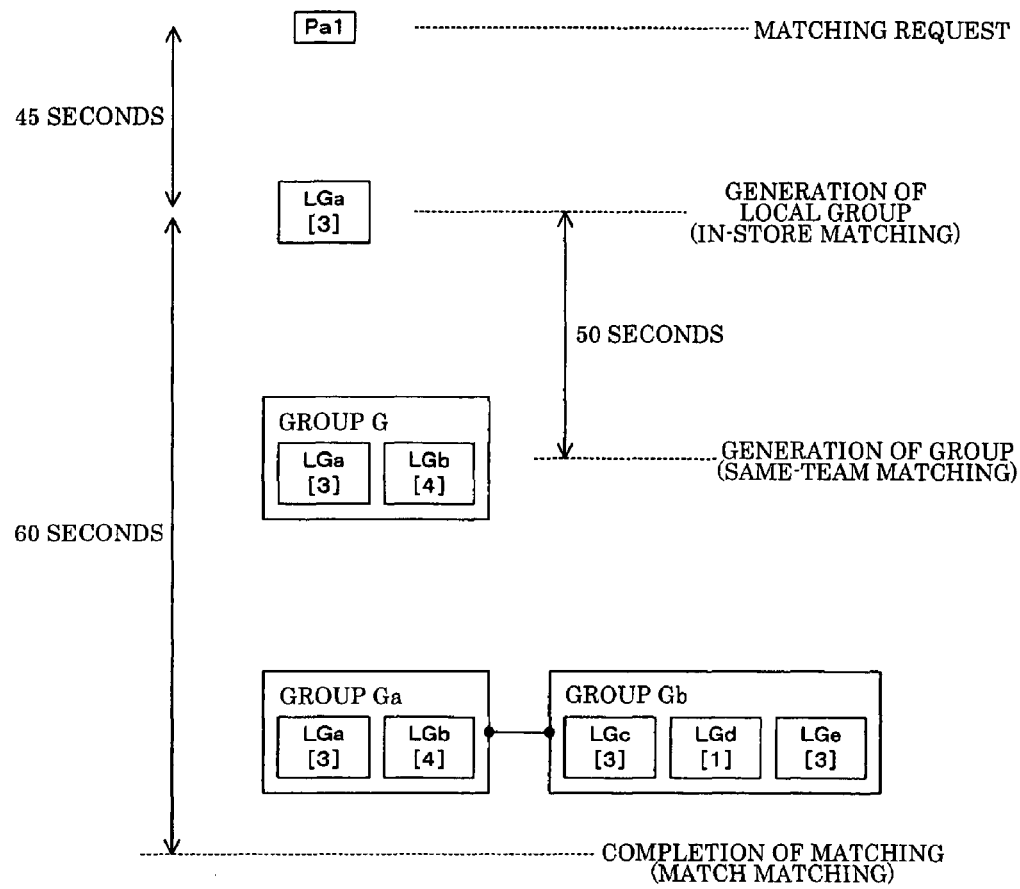
FIG. 13 is a view illustrative of a matching time limit.

In this embodiment, the matching server 10 completes matching within a specific period of time after receiving a matching request from the game terminal 70, and returns the matching results to the game terminal 70. Specifically, as shown in FIG. 13, the matching server 10 completes in-store matching within a specific period of time (e.g., 45 seconds) after receiving the matching request, and completes out-of-store matching within a specific period of time (e.g., 60 seconds) after completion of in-store matching. The matching server 10 completes same-team matching within a specific period of time (e.g., 50 seconds) after completion of in-store matching taking the time required for match matching into consideration.

Reservation Principle

In the game system 1 according to this embodiment, game play is performed by advance reservation only. Specifically, a player reserves game play using the terminal 50 in the store in which the player desires to play a game, and plays a game using the game terminal 70 specified by the terminal 50 at the reserved time.

The time for which reservation is received (reservation reception time) is determined taking the time required for one game play into consideration. Specifically, the reservation reception time is determined at time intervals (e.g., intervals of 10 minutes) taking into consideration the time (e.g., 7 minutes) required for one game play and a specific time (3 minutes) required for the next player who plays a game to complete standby (e.g., game data such as the play results of the player who has played a game is recorded in the game card 80, the game card 80 is ejected, and another player stands by). For example, when the game specifies a time limit, the time limit corresponds to the time required for one game play.

One of the teams is alternatively specified as a playable team in game play units at each reservation reception time, for example. Specifically, different reservation reception times are specified as playable times in team units. A player can reserve game play only at the time specified as the time at which the team to which the player belongs can play a game. The number of players whose reservation can be received for each reservation reception time is equal to the number of game terminals 70 installed in the store.

Figure 14:
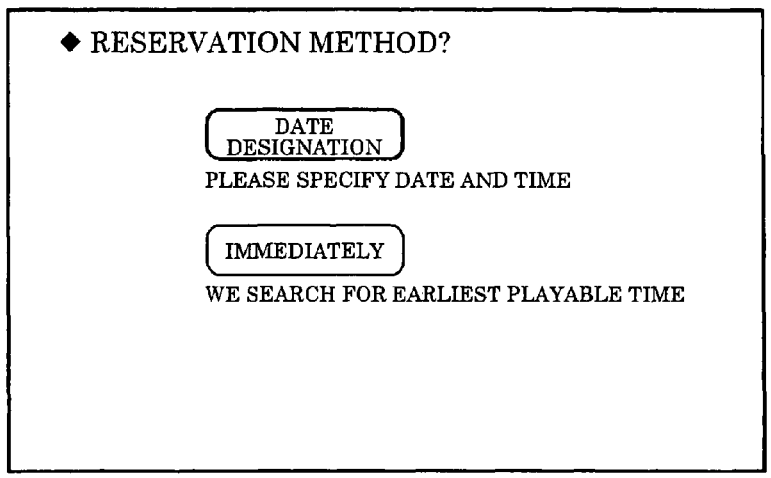
FIG. 14 shows an example of a reservation menu screen.

The game play reservation procedure is described below referring to a display screen of the terminal 50. A reservation menu screen for specifying a reservation method is displayed on the display 52 of the terminal 50. FIG. 14 is a view showing an example of the reservation menu screen. As shown in FIG. 14, an item "date designation" which allows the player to reserve game play while specifying the desired date and time and an item "immediately" which allows the player to reserve game play at the earliest playable time at present are displayed on the reservation menu screen as the reservation menu.

When the player has selected the item "date designation" using the reservation menu screen, a date designation screen (not shown) which allows the player to specify the present date or a date after the present date is displayed. When the player has specified the date using the date designation screen, a reservation state screen is displayed on which the reservation state at the specified date is displayed in a list. FIG. 15 is a view showing an example of the reservation state screen. As shown in FIG. 15, the names of the playable teams and the number of game terminals 70 which can be reserved at present (reservable number) are listed on the reservation state screen in time series in reservation reception time units as the reservation state at the specified date.

When reserving game play, the player inserts his game card 80 into the card insertion slot 55. The times at which the team recorded in the game card 80 to which the player belongs can play a game and the reservable number is one or more are displayed to be selectable. When the player selects the desired time from the times displayed to be selectable, game play is reserved at the desired time.

When the player has selected the item "immediately" using the reservation menu screen, a latest vacancy state screen is displayed on which the latest vacancy state is displayed in team units. FIG. 16 is a view showing an example of the latest vacancy state screen. As shown in FIG. 16, the reservable times (i.e., time at which the reservable number is one or more) among the reservation reception times for the player of each of the team A and the team B are listed on the latest vacancy state screen in the order from the reservable time closer to the present time together with the number (reservable number) of game terminals 70 which can be reserved.

When reserving game play, the player inserts his game card 80 into the card insertion slot 55. The time closest to the present time among the reservable times of the team recorded in the game card 80 to which the player belongs and a message (not shown) which asks the player whether or not to reserve game play at that time are displayed. When the player has selected reservation in response to the message, game play is reserved at that time. In this case, the player can change the reservation time to the time next closest the present time among the reservable times of the team to which the player belongs according to the displayed message.

When game play has been reserved, data relating to the reservation such as the reserved time and the name of the store is recorded in the game card 80, and the game card 80 is ejected from the card insertion slot 55. In this case, the reserved time, the name of the store, and the like may be printed on a printing surface of the game card 80.

Figure 17:
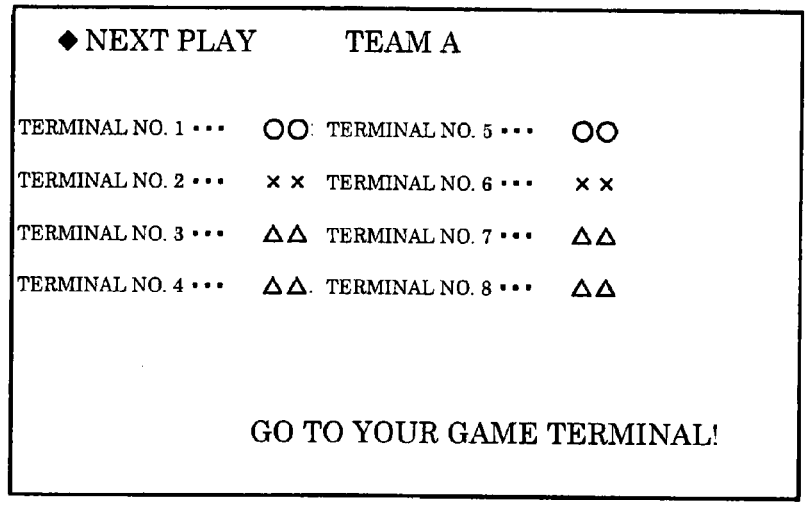
FIG. 17 shows an example of a next play assignment screen.

When a time a specific time (e.g., one minute) before the reservation reception time has been reached, the terminal 50 displays a next play assignment screen displaying assignment of the game terminals 70 to the players during the next game play on the large screen 56. FIG. 17 is a view showing an example of the next play assignment screen. As shown in FIG. 17, the name of the team playable in the next game play and the name of the player assigned to each game terminal 70 are listed on the next play assignment screen. Each game terminal 70 displays the name of the player assigned to the game terminal 70 on the display 76. The player plays a game using the game terminal 70 specified on the next play assignment screen.

Matching Server

Figure 18:
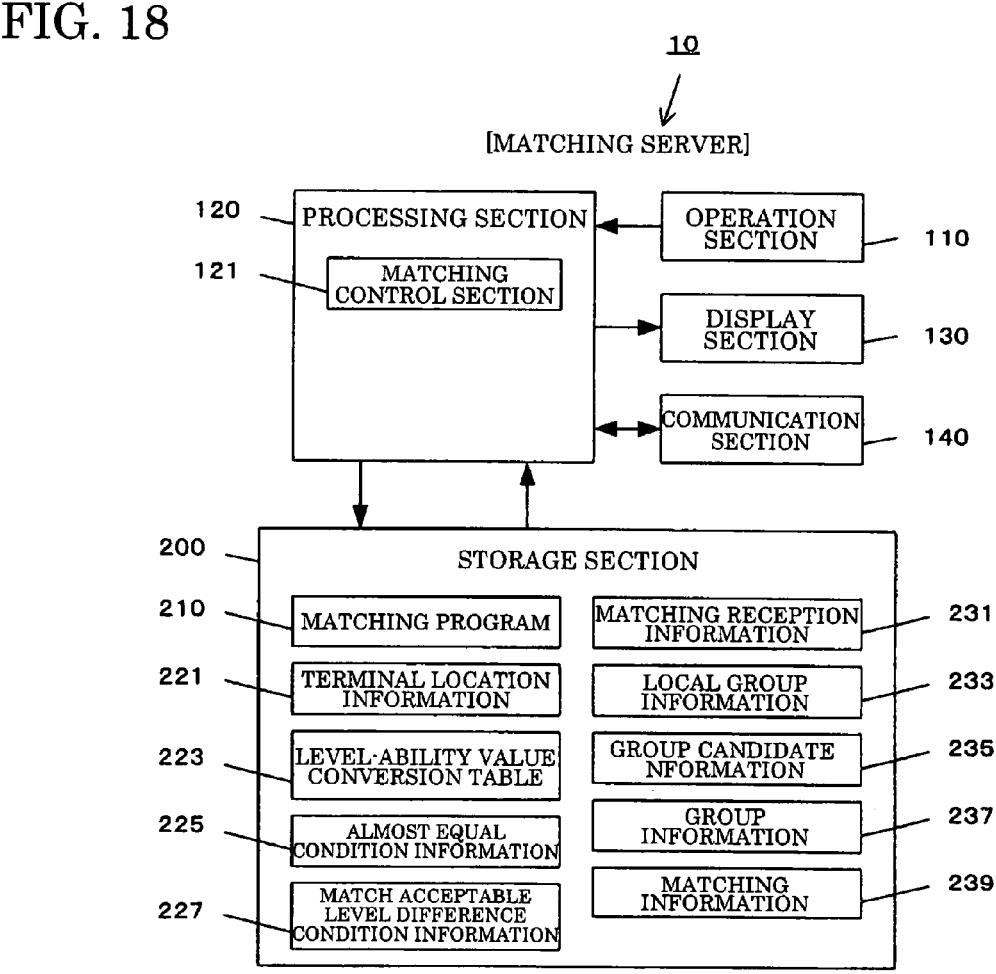
FIG. 18 is a functional configuration diagram showing a matching server.

FIG. 18 is a block diagram showing the functional configuration of the matching server 10. As shown in FIG. 18, the matching server 10 is functionally configured to include an operation section 110, a processing section 120, a display section 130, a communication section 140, and a storage section 200.

The operation section 110 receives an operation instruction input from an administrator of the matching server 10, and outputs an operation signal corresponding to the operation to the processing section 120. The function of the operation input section 110 is implemented by a button switch, a lever, a dial, a mouse, a keyboard, a touch panel, various sensors, and the like.

The processing section 120 controls the entire matching server 10 based on a program and data stored in the storage section 200, the operation signal input from the operation section 110, data received from an external device (mainly the game terminal 70) through the communication section 140, and the like. The function of the processing section 120 is implemented by a calculation device such as a CPU (CISC or RISC) or an ASIC (e.g. gate array) and its control program, for example. In this embodiment, the processing section 120 includes a matching control section 121.

The matching control section 121 performs a matching process of combining players who play a match. Specifically, when the matching control section 121 has received a matching request transmitted from the game terminal 70, the matching control section 121 specifies the location of the game terminal 70 (store in which the game terminal 70 is installed) corresponding to the terminal ID received together with the matching request referring to terminal location information 221, and accepts matching.

Figures 19, 20:
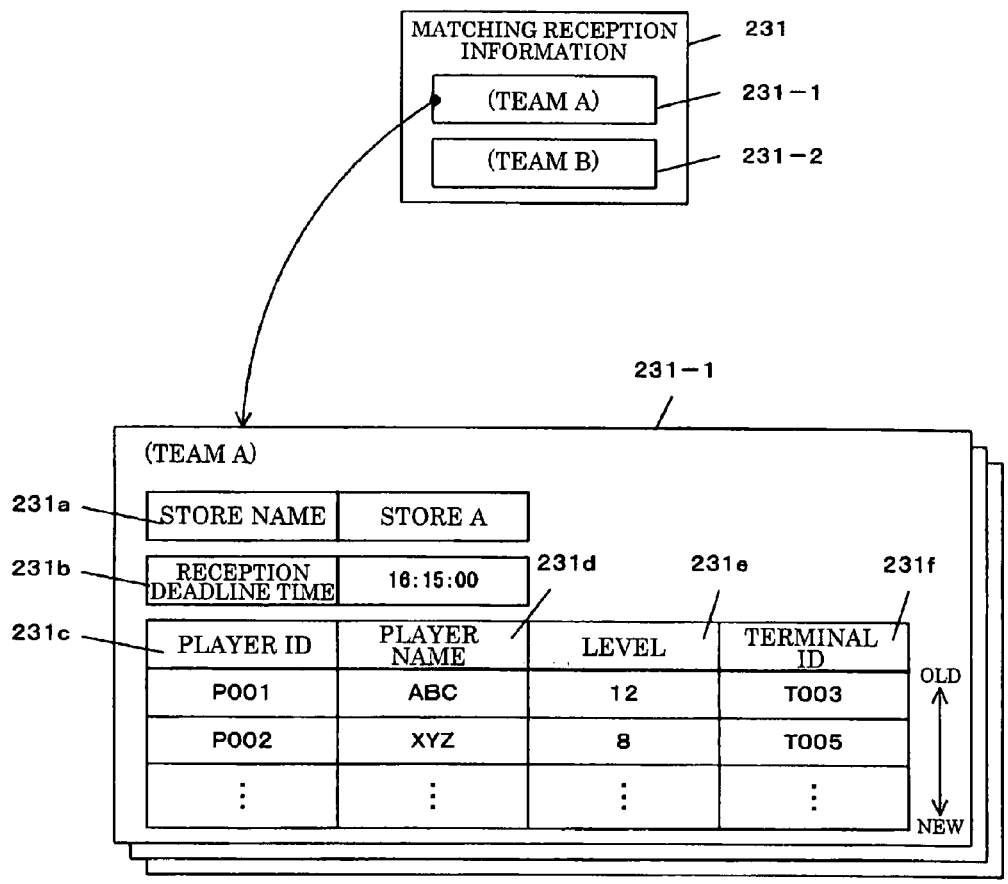
FIG. 19 shows a data configuration example of terminal location information.
FIG. 20 shows a data configuration example of matching reception information.

FIG. 19 is a view showing an example of the data configuration of the terminal location information 221. As shown in FIG. 19, a location 221b is stored as the terminal location information 221 while being associated with a terminal ID221a of each game terminal 70. The location 221b is the play area such as the name of a store or a floor in which the game terminal 70 is installed.

Data relating to the matching request received by the matching control section 121 is stored as matching reception information 231. FIG. 20 is a view showing an example of the data configuration of the matching reception information 231. As shown in FIG. 20, the matching reception information 231 is generated in team units. Specifically, the matching reception information 231 includes matching reception information 231-1 for the team A and matching reception information 231-2 for the team B. The matching reception information 231-1 and the matching reception information 231-2 are respectively generated in store units. A store name 231a and a reception deadline time 231b are stored as the matching reception information 231-1 and the matching reception information 231-2. A player ID231c, a player name 231d, a level 231e, and a terminal ID 231f of each player for which matching has been accepted are also stored as the matching reception information 231-1 and the matching reception information 231-2 while being associated with one another. The reception deadline time 231b is the time at which reception of the corresponding matching request is closed. A time after a specific time (e.g., 45 seconds) from the reception time of the oldest matching request among the matching requests which have been received is set as the reception deadline time 231b. FIG. 20 shows the matching reception information 231-1 for the team A. Note that the matching reception information 231-2 for the team B has the same configuration as the matching reception information 231-1 for the team A.

When the reception deadline time set as the matching reception information 231 has been reached, the matching control section 121 closes reception of the matching request, and generates a local group LG of the players whose matching request has been received. After reception of the matching request has been closed, the matching reception information 231 based on which the local group LG has been generated is deleted.

Figure 21:
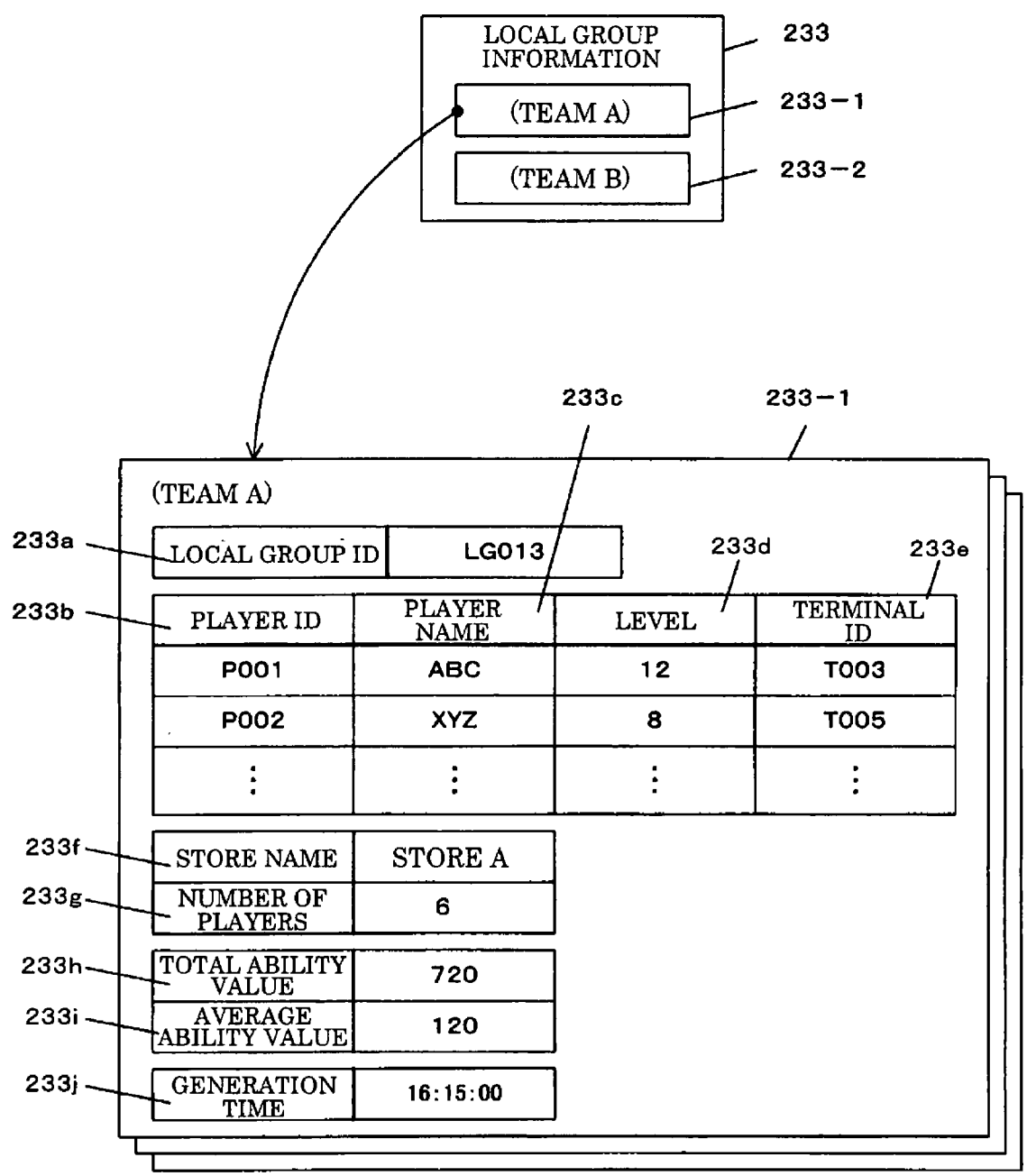
FIG. 21 shows a data configuration example of local group information.

Data relating to the generated local group LG is stored as local group information 233. FIG. 21 is a view showing an example of the data configuration of the local group information 233. As shown in FIG. 21, the local group information 233 is generated in team units. Specifically, the local group information 233 includes local group information 233-1 for the team A and local group information 233-2 for the team B. The local group information 233-1 and the local group information 233-2 are respectively generated in store units. A local group ID 233a, a store name 233f, a number of players 233g, a total ability value 233h, an average ability value 233i, and a generation time 233j are stored as the local group information 233-1 and the local group information 233-2. A player ID 233b, a player name 233c, a level 233d, and a terminal ID 233e of each player forming the local group LG are also stored as the local group information 233-1 and the local group information 233-2 while being associated with one another. The total ability value 233h is the sum of the ability values obtained by converting the levels 233 of the respective players forming the local group LG according to a level-ability value conversion table 223. The average ability value 233i is the average value of the ability values of the respective players. The average ability value 233i is a value obtained by dividing the total ability value 233h by the number of players 233g. FIG. 21 shows the group information 237-1 for the team A. Note that the group information 237-2 for the team B has the same configuration as the group information 237-1 for the team A.

The level-ability value conversion table 223 is a data table for converting the level of each player into the ability value. FIG. 22 shows an example of the data configuration of the level-ability value conversion table 223. As shown in FIG. 22, a level 223a and an ability value 223b are stored in the level-ability value conversion table 223 while being associated with each other. The level-ability value conversion table 223 is set so that the ability value 223b increases along with an increase in the level 223.

The matching control section 121 combines the generated local groups LG in team units to generate the group candidates KG of each team. Specifically, when the matching control section 121 has generated the local group LG, the matching control section 121 generates a new group candidate KG including the generated local group LG. The numbers of players of the newly generated group candidates KG is four or more and eight or less. The difference in total ability value between the local groups forming each of the generated group candidates KG is then calculated, and a group candidate KG of which the calculated difference in total ability value does not satisfy the almost equal condition is deleted.

The almost equal condition is stored as almost equal condition information 225. FIG. 23 is a view showing an example of the data configuration of the almost equal condition information 225. As shown in FIG. 23, a condition for the difference in average ability value between the local groups LG ("200" or less in FIG. 23) is stored as the almost equal condition information 225.

Figure 24:
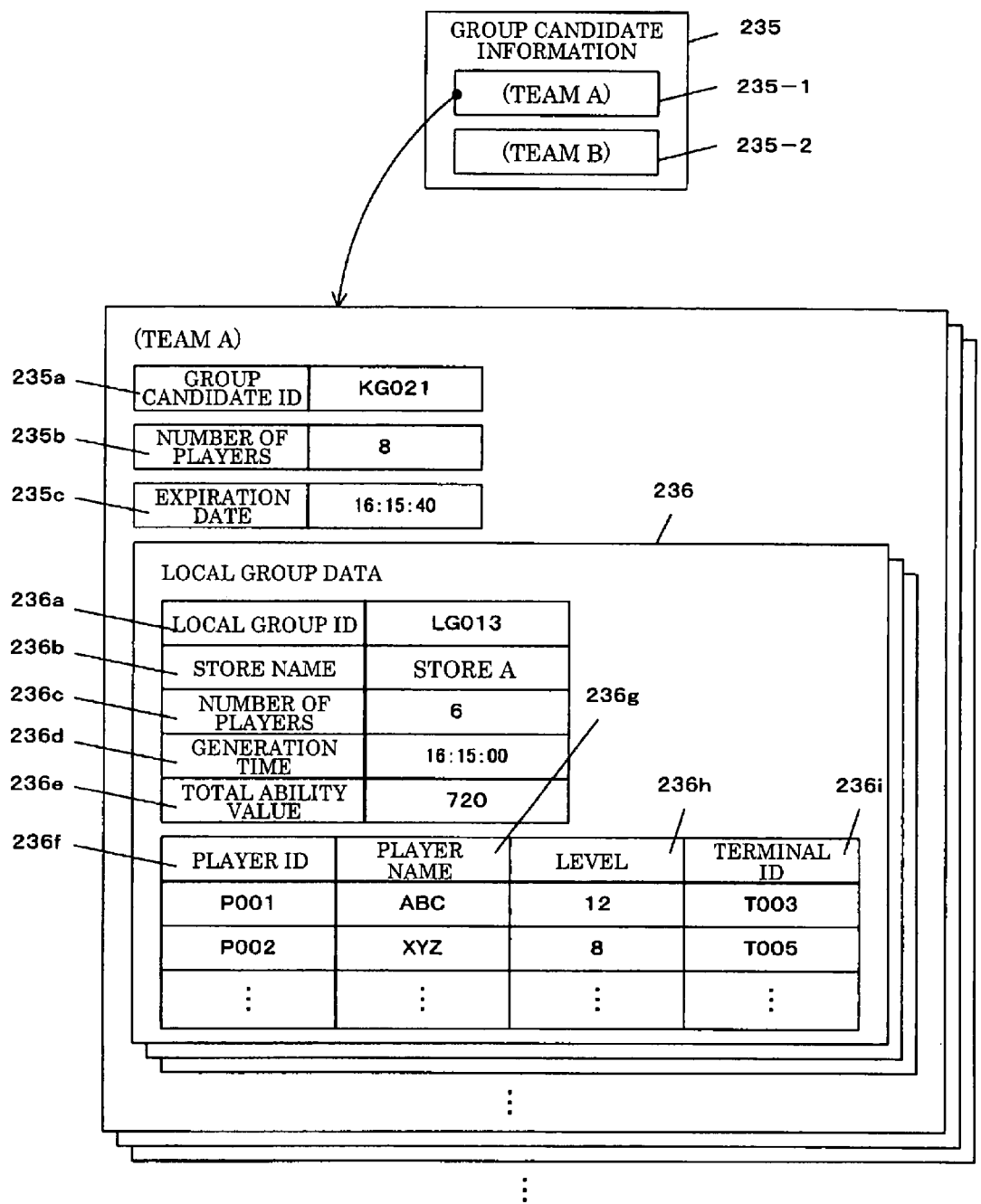
FIG. 24 shows a data configuration example of group candidate information.

Data relating to the generated group candidate KG is stored as group candidate information 235. FIG. 24 shows an example of the data configuration of the group candidate information 235. As shown in FIG. 24, the group candidate information 235 is generated in team units. Specifically, the group candidate information 235 includes group candidate information 235-1 for the team A and group candidate information 235-2 for the team B. The group candidate information 235-1 and the group candidate information 235-2 are respectively generated in store units. A group candidate ID 235a, a number of players 235b, and an expiration date 235c are stored as the group candidate information 235-1 and the group candidate information 235-2. Local group data 236 of each local group LG forming the group candidate KG is also stored as the group candidate information 235-1 and the group candidate information 235-2. The expiration date 235c is the expiration date of the group candidate KG. A time after a specific time (e.g., 50 seconds) from the time at which the group candidate KG is generated is set as the expiration date 235c. A local group ID 236a, a store name 236b, a number of players 236c, a generation time 236d, and a total ability value 236e are stored as the local group data 236. A player ID 236f, a player name 236g, a level 236h, and a terminal ID 236i of each player forming the local group LG are also stored as the local group data 236 while being associated with one another. FIG. 24 shows the group candidate information 235-1 for the team A. Note that the group candidate information 237-2 for the team B has the same configuration as the group candidate information 235-1 for the team A.

The matching control section 121 allows the generated group candidate KG of which the number of players is eight to be formed as a group G. The matching control section 121 allows the group candidate KG of which the number of players is less than eight to be formed as a group G when the expiration date set in advance has been reached. After the groups G have been formed, other group candidates KG including each local group LG forming the formed groups G are deleted.

Figure 25:
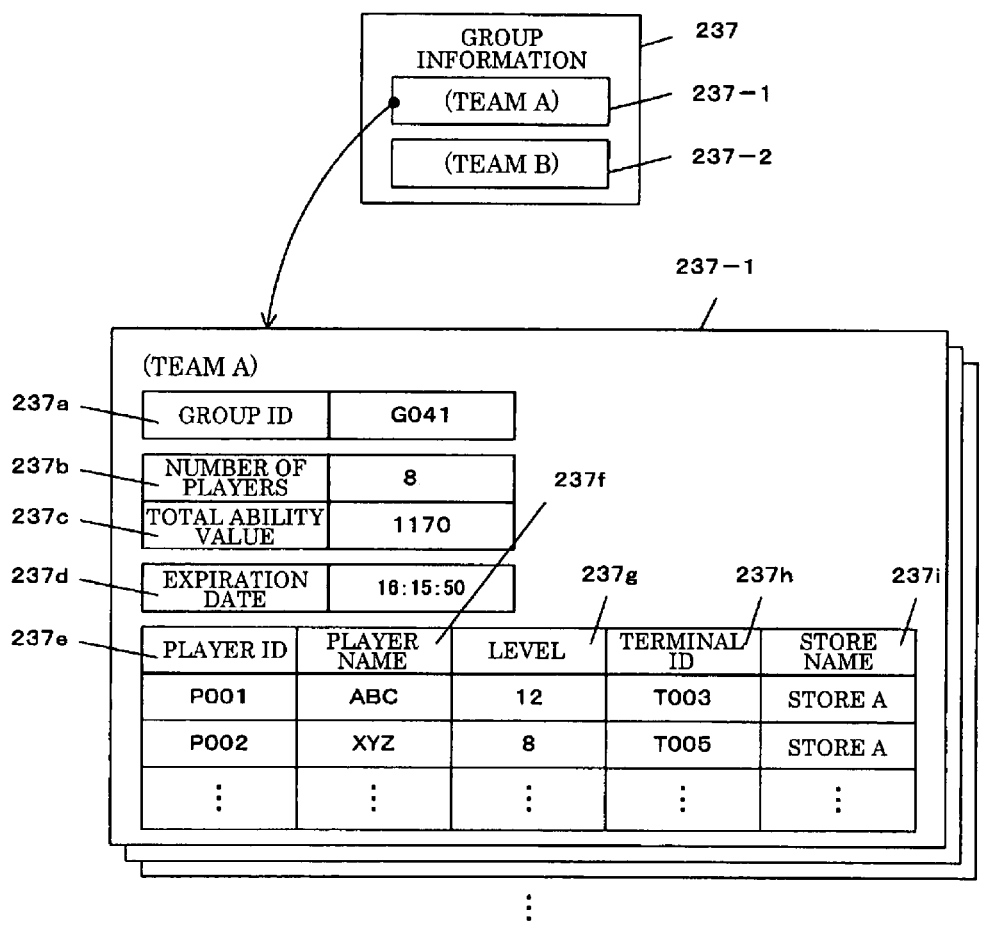
FIG. 25 shows a data configuration example of group information.

Data relating to the formed groups G is stored as group information 237. FIG. 25 is a view showing an example of the data configuration of the group information 237. As shown in FIG. 25, the group information 237 is generated in team units. Specifically, the group information 237 includes group information 237-1 for the team A and group information 237-2 for the team B. The group information 237-1 and the group information 237-2 are respectively generated in store units. A group ID 237a, a number of players 237b, a total ability value 237c, and an expiration date 237d are stored as the group information 237-1 and the group information 237-2. A player ID 237e, a player name 237f, a level 237g, a terminal ID 237h, and a store name 237i are also stored as the group information 237-1 and the group information 237-2 while being associated with one another. The total ability value 237c is the sum of the total ability values of the local groups LG forming the group G (i.e., the sum of the ability values obtained by converting the levels of the players forming the group G). The expiration date 237d is the expiration date of the group G. A time after a specific time (e.g., 50 seconds) from the generation time of the local group LG of which the generation time is the earliest (oldest) among the group candidates KG forming the group G is set as the expiration date 237d. FIG. 25 shows the group information 237-1 for the team A. Note that the group information 237-2 for the team B has the same configuration as the group information 237-1 for the team A.

The matching control section 121 performs match matching in which the groups G of different teams are combined to determine opposing groups. Specifically, when a group G has been formed, the matching control section 121 selects groups G of which the number of players is the same as the formed group G from the groups G of the opposite team. The matching control section 121 determines whether or not the selected groups G of the opposite team satisfy the match condition for opponent matching in the order from the group G of which the set expiration date is earliest. Specifically, the matching control section 121 determines whether or not (1) the game terminals 70 of the same store are not included in the opposite groups G and (2) the difference in total ability value between the opposite groups G satisfies the match allowable level difference condition as the match condition. When the matching control section 121 has determined that the selected group G of the opposite team satisfies the match condition, the matching control section 121 determines the group G of the opposite team which satisfies the match condition to be an opponent of the formed group G.

Figure 26:
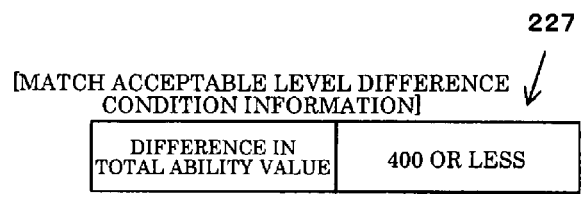
FIG. 26 shows a data configuration example of a match allowable level difference condition.

The match allowable level difference condition is stored as match allowable level difference condition information 227. FIG. 26 shows an example of the data configuration of the match allowable level difference condition information 227. As shown in FIG. 26, a condition for the difference in total ability value between the groups G ("400" in FIG. 26) is stored as the match allowable level difference condition information 227.

When a group G of the opposite team of which the number of players is the same as that of the formed group G does not exist or the groups G of the opposite team of which the number of players is the same as that of the formed group G do not satisfy the match condition, the matching control section 121 determines whether or not each of the groups G of the opposite team of which the number of players differs from that of the formed group G satisfies the match condition when the expiration date set for the formed group G has been reached, and determines the group G of the opposite team which satisfies the match condition to be an opponent of the formed group G. Specifically, the matching control section 121 determines whether or not each of the selected groups G of the opposite team satisfies the match condition while increasing the difference (difference in number of players) n between the number of players M of the formed group G and the number of players N of the selected group G of the opposite team by one, and determines the group G of the opposite team to be matched with the formed group G Specifically, the matching control section 121 selects the groups G of the opposite team of which the number of players N is smaller by one than the number of players M of the formed group G from the groups G of the opposite team, determines whether or not each of the selected groups G satisfies the match condition in the order from the group of which the set expiration date is the earliest, and determines the group G of the opposite team which satisfies the match condition to be an opponent of the formed group G. When the selected groups G of the opposite team do not satisfy the match condition, the matching control section 121 selects the groups G of the opposite team of which the number of players N is larger by one than the number of players M of the formed group G from the groups G of the opposite team, and determines whether or not each of the selected groups G satisfies the match condition.

For example, when the number of players M of the group G is eight, the matching control section 121 determines whether or not each of the groups G of the opposite team of which the number of players N is seven satisfies the match condition. When matching has failed, the matching control section 121 determines whether or not each of the groups G of the opposite team of which the number of players N is six satisfies the match condition, determines whether or not each of the groups G of the opposite team of which the number of players N is five satisfies the match condition, and then determines whether or not each of the groups G of the opposite team of which the number of players N is four satisfies the match condition. When the number of players M of the group G is six, the matching control section 121 determines whether or not each of the groups G of the opposite team of which the number of players N is five satisfies the match condition. When matching has failed, the matching control section 121 determines whether or not each of the groups G of the opposite team of which the number of players N is seven satisfies the match condition, determines whether or not each of the groups G of the opposite team of which the number of players N is four satisfies the match condition, and then determines whether or not each of the groups G of the opposite team of which the number of players N is eight satisfies the match condition.

When the number of players differs between the formed group G and the group G of the opposite team, a COM player is added to the group G of which the number of players is smaller so that the numbers of players of the formed group G and the group G of the opposite team become equal, and the difference in total ability value between the groups G is calculated on the assumption that the numbers of players of the groups G are the same. The level of the COM player is set at a low level (e.g., "2").

When the groups G which differ in the number of players have been matched, a COM player is added to the group G of which the number of players is smaller so that the numbers of players of the groups G matched become equal.

When the groups G of the opposite team do not satisfy the match condition irrespective of the number of players so that matching has failed, a group of the opposite team formed of COM players in a number equal to the number of players of the formed group G is generated, and the generated group is determined to be an opponent of the formed group G Data relating to matching is stored as matching information 239. FIG. 27 is a view showing an example of the data configuration of the matching information 239. As shown in FIG. 27, the matching information 239 is generated in matching units. A matching ID 239a and a number of players 239b are stored as the matching information 239. A player ID 239c, a player name 239d, a terminal ID 239e, and a store name 239f of each group are also stored as the matching information 239 while being associated with one another. The number of players 239b is the number of players of each group G matched.

In FIG. 18, the display section 130 displays a display screen based on an image signal from the processing section 120. The function of the display section 130 is implemented by hardware such as a CRT, an LCD, an ELD, or a PDP.

The communication section 140 connects with the communication line N based on a control signal from the processing section 120, and performs data communication with an external device (e.g. game terminal 70). The function of the communication section 140 is implemented by a wireless communication module, a TA, a router, a jack for a communication cable, a control circuit, or the like.

The storage section 200 stores a system program for implementing the functions for causing the processing section 120 to integrally control the matching server 10, a program and data necessary for implementing the functions according to this embodiment, and the like. The storage section 200 is used as a work area for the processing section 120, and temporarily stores the results of calculations performed by the processing section 120 based on various programs, data input from the operation input section 110, and the like. The function of the storage section 200 is implemented by an IC memory, a hard disk, a CD-ROM, a DVD, an MO, a RAM, a VRAM, or the like.

In this embodiment, the storage section 200 stores a matching program 210 for causing the processing section 120 to function as the matching control section 121, the terminal location information 221, the level-ability value conversion table 223, the almost equal condition information 225, the match allowable level difference condition information 227, the matching reception information 231, the local group information 233, the group candidate information 235, the group information 237, and the matching information 239.

Terminal

Figure 28:
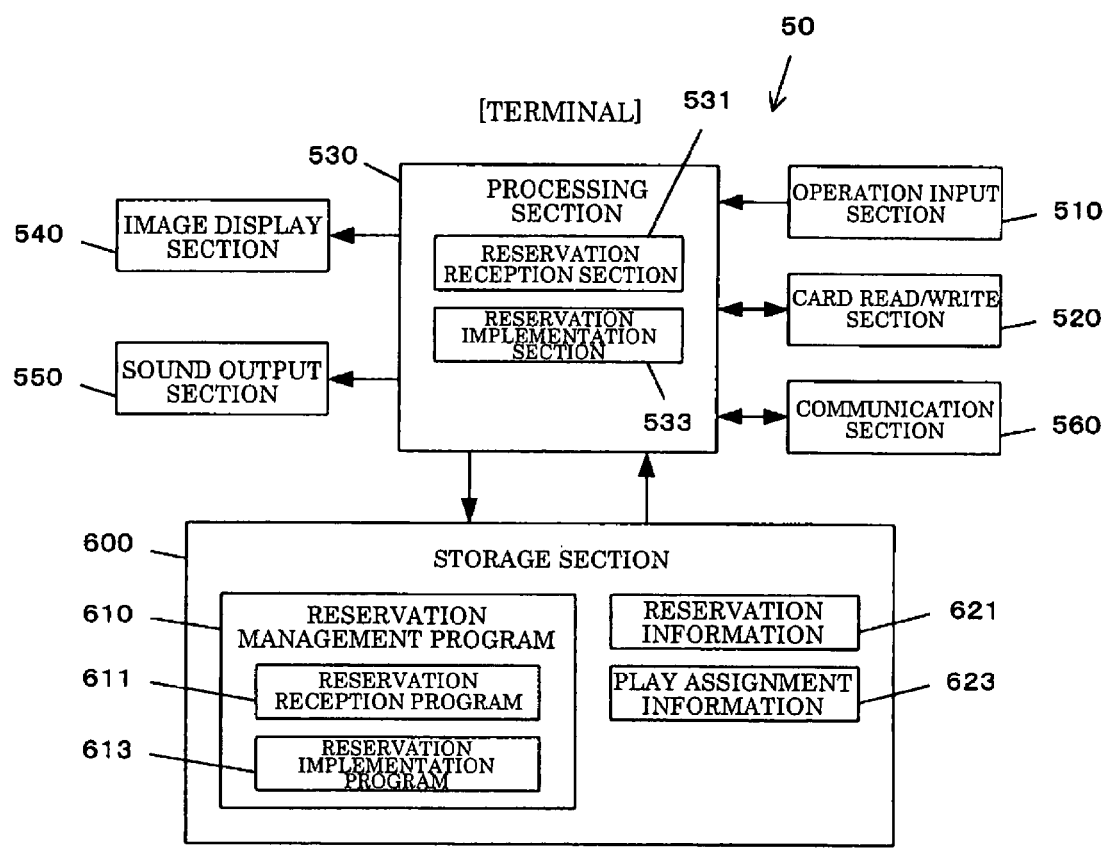
FIG. 28 is a functional configuration diagram showing a terminal.

FIG. 28 is a block diagram showing the functional configuration of the terminal 50. As shown in FIG. 28, the terminal 50 is functionally configured to include an operation input section 510, a card read/write section 520, a processing section 530, an image display section 540, a sound output section 550, a communication section 560, and a storage section 600.

The operation input section 510 receives a player's operation instruction input, and outputs an operation signal corresponding to the operation to the processing section 530. The function of the operation input section 510 is implemented by a button switch, a lever, a dial, a mouse, a keyboard, a touch panel, various sensors, and the like. In FIG. 2, the operation button 54 and the touch panel integrally formed in the display 52 correspond to the operation input section 510.

The card read/write section 520 reads data recorded in the inserted game card 80, and outputs the read data to the processing section 530. The card read/write section 520 records data in the inserted game card 80 based on a write instruction signal from the processing section 530. In FIG. 2, the card insertion slot 55 corresponds to the card read/write section 520.

The processing section 530 controls the entire terminal 50 based on a program and data stored in the storage section 600, the operation signal input from the operation section 510, data received from an external device (mainly the game terminal 70) through the communication section 560, and the like. The function of the processing section 530 is implemented by a calculation device such as a CPU (CISC or RISC) or an ASIC (e.g. gate array) and its control program, for example. In this embodiment, the processing section 530 includes a reservation reception section 531 and a reservation implementation section 533.

The reservation reception section 531 receives reservation for game play based on the operation of the player. Specifically, the reservation reception section 531 causes the image display section 540 to display the reservation menu screen such as that shown in FIG. 14. When the item "date designation" is selected as the reservation method using the reservation menu screen, the reservation reception section 531 causes the image display section 540 to display the date designation screen which allows the player to specify the present date or a date after the present date. When the date has been specified using the date designation screen, the reservation reception section 531 refers to reservation information 621 and causes the image display section 540 to display the reservation state screen in which the reservation state at the specified date is listed, as shown in FIG. 15, for example.

Figure 29:
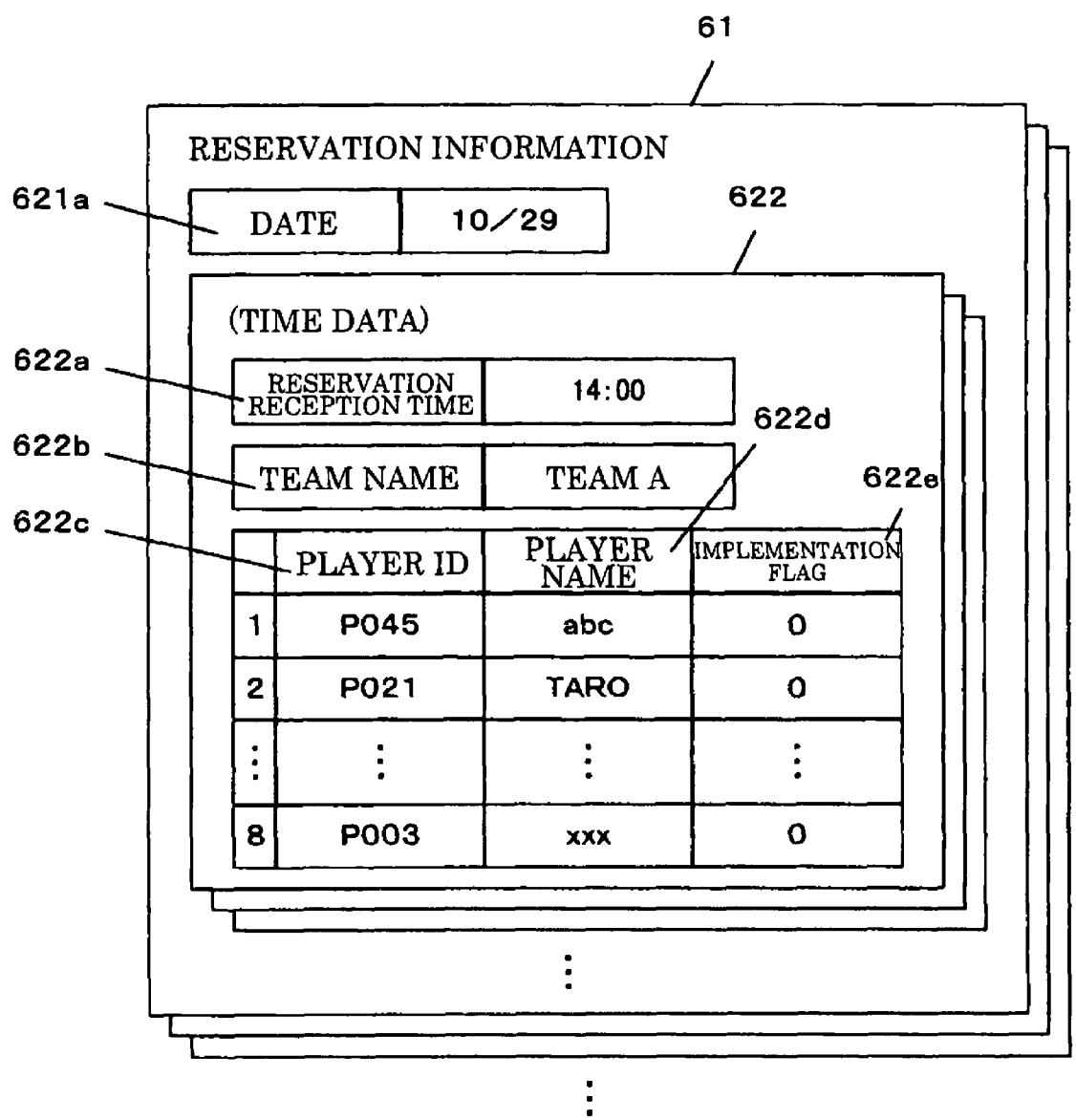
FIG. 29 shows a data configuration example of reservation information.
Figure 32:
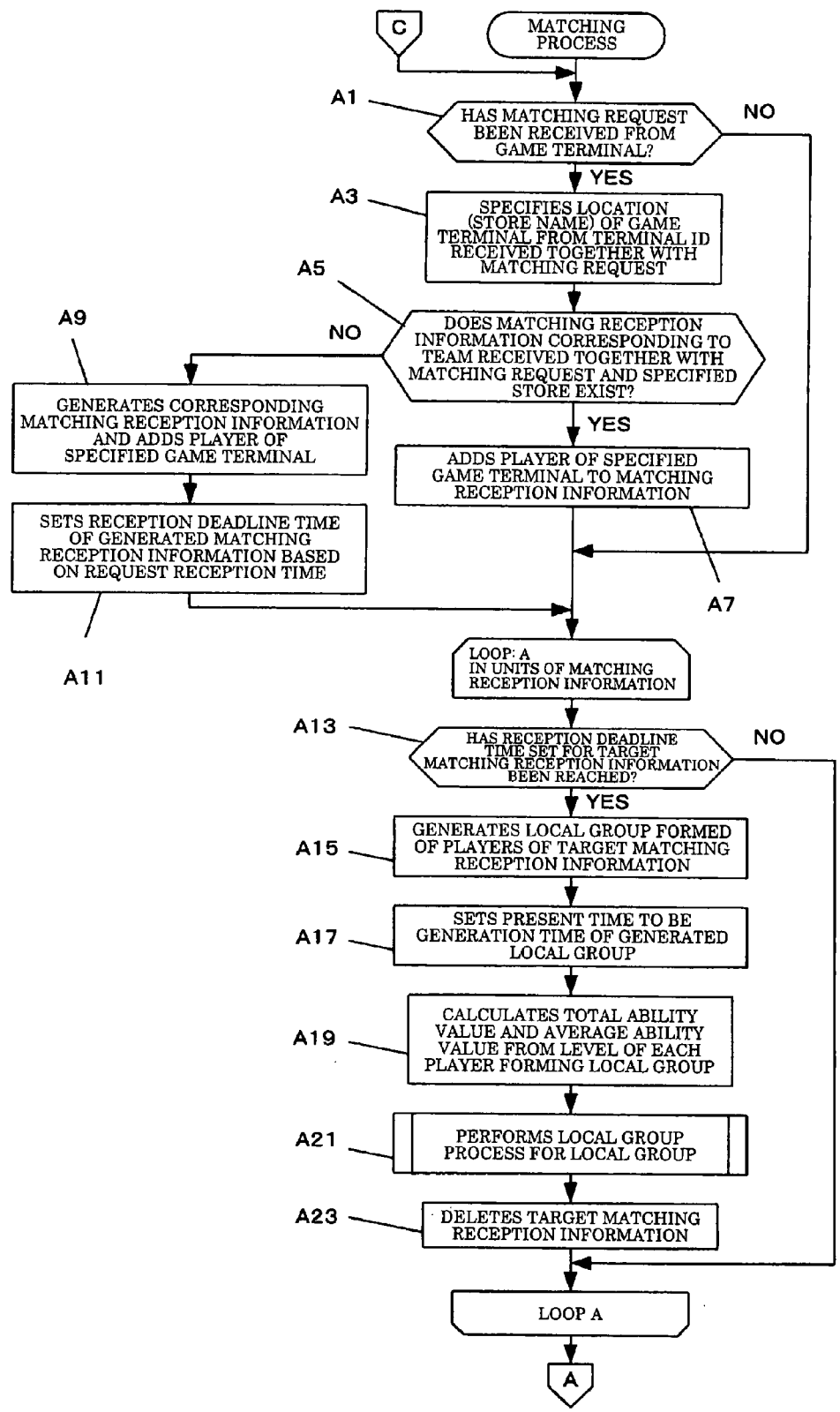
FIG. 32 is a flowchart showing a matching process of a matching server.
Figure 33:
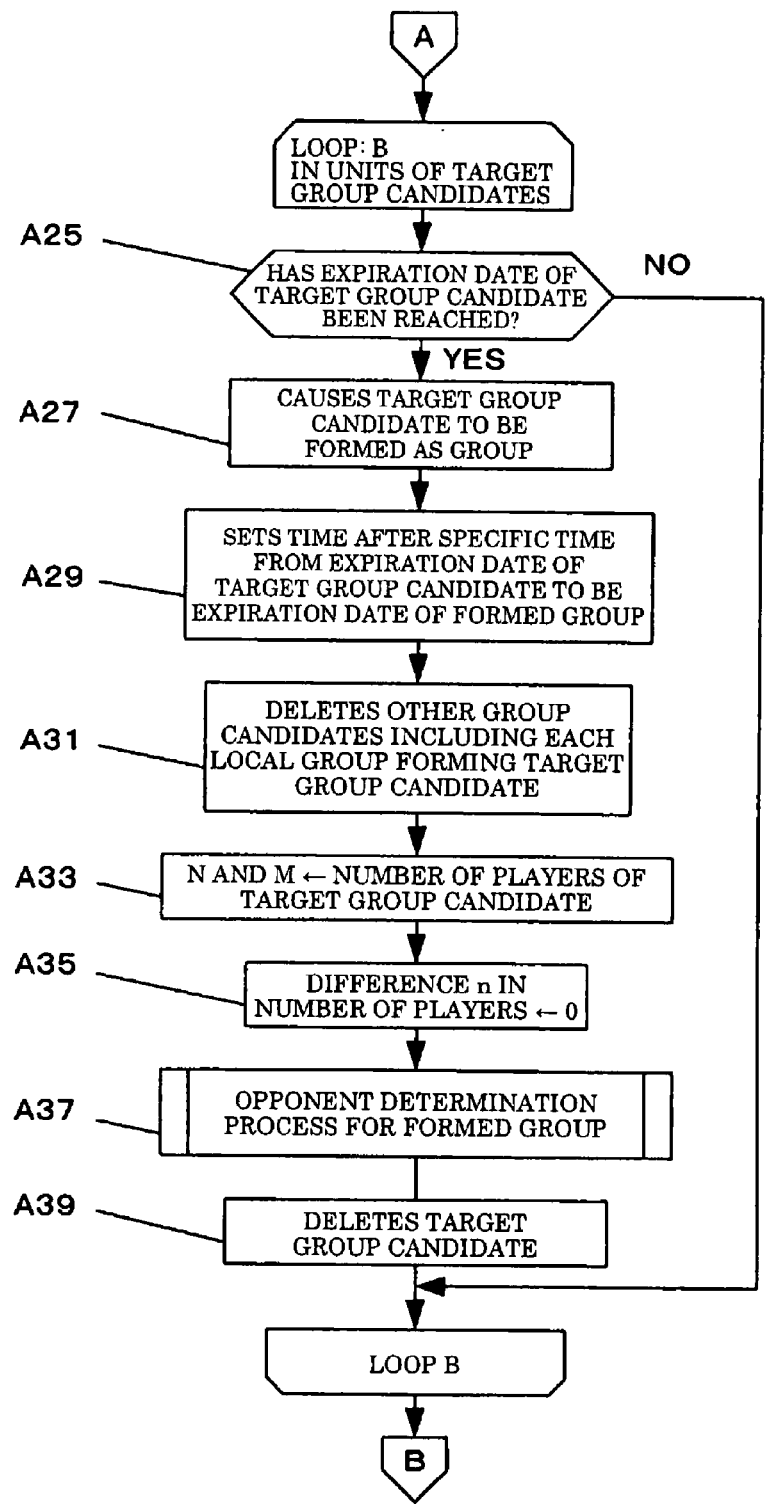
FIG. 33 is a flowchart showing the matching process continued from FIG. 32.
Figure 34:
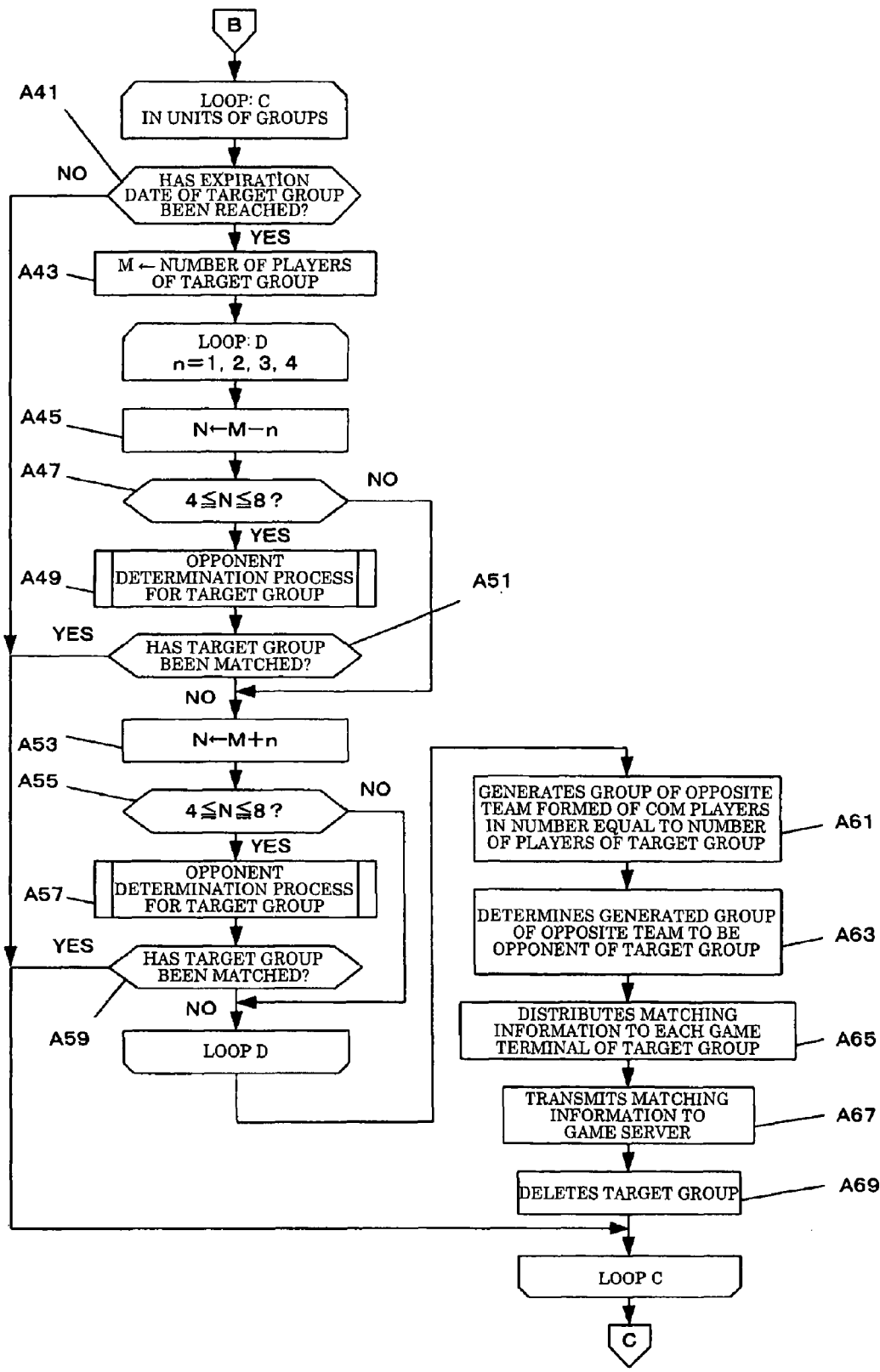
FIG. 34 is a flowchart showing the matching process continued from FIG. 33.

The reservation information 621 is data relating to the received reservation for game play. FIG. 29 is a view showing an example of the data configuration of the reservation information 621. As shown in FIG. 29, the reservation information 621 is generated in day units. A date 621a and time data 622 in reservation reception time units are stored as the reservation information 621. A reservation reception time 622a and a team name 622b playable at the reservation reception time are stored as the time data 622. A player ID 622c, a player name 622d, and an implementation flag 622e of each player reserved at the reservation reception time are stored as the time data 622 while being associated with one another. The implementation flag 622e is a flag indicating whether or not the player has actually played the game. When a standby completion notification indicating that the player has played a game which is transmitted from the game terminal 70 assigned to the player has been received, "1" indicating implementation is stored as the implementation flag 622e. The number of allowable players at each reservation reception time is fixed. Specifically, the number of allowable players at each reservation reception time is equal to the number of game terminals 70 connected to the terminal 50.

When data read from the inserted game card 80 has been input from the card read/write section 520, the reservation reception section 531 specifies the team to which the player belongs from the input data, and causes the reservable time (time at which the reservable number is one or more) at which the player of the specified team can play a game and which is contained the reservation state displayed in the reservation state screen to be displayed to be selectable. When the player has selected the time using the reservation state screen to direct a reservation, game play is reserved at the selected time. The reservation reception section 531 then causes the card read/write section 520 to record the received reservation information (e.g., store name and reservation time) in the game card 80 and eject the game card 80.

FIG. 30 is a view showing an example of the configuration of data recorded in the game card 80. As shown in FIG. 30, a card ID 81, player data 82 of the player who possesses the game card 80, reservation data 83, and a new flag 84 are recorded in the game card 80. The player data 82 includes a player ID 82a, a player name 82b, a level 82c, and a team 82d. The reservation data 83 includes a reservation store 83a and a reservation date 83b. The new flag 84 is a flag which indicates whether or not the player who possesses the game card 80 is a new player who has not played a game after purchasing the game card 80. The surface of the game card 80 may be formed as a rewritable printing surface, and some (e.g., game name, level, team, reservation store, and reservation date) or all of the recorded data may be rewritably printed on the printing surface of the game card 80.

When the player has selected the item "immediately" using the reservation menu screen, the reservation reception section 531 refers to the reservation information 621, and extracts the reservable times (times at which the reservable number is one or more) at the present date or a date after the present date in team units from the reservation reception times at which the team can play a game. The reservation reception section 531 then causes the image display section 540 to display the latest vacancy state screen in which the extracted times are listed in time series, as shown in FIG. 16, for example.

When data read from the inserted game card 80 has been input from the card read/write section 520, the reservation reception section 531 specifies the team to which the player belongs from the input data, selects the time of the specified team closest to the present time from the reservation reception times displayed in the reservation state screen, and causes the image display section 540 to display a message which asks the player whether or not to reserve game play at the selected time. When the player has directed reservation, game play is reserved at the selected time. The reservation reception section 531 then causes the card read/write section 520 to record the received reservation information (e.g., store name and reservation time) in the game card 80 and eject the game card 80.

The processing section 530 manages execution of game play in each game terminal 70 based on the game play reservation received by the reservation implementation section 533 and the reservation reception section 531. Specifically, the processing section 530 refers to the reservation information 621, and closes reservation for game play at the reservation reception time when a specific time (e.g., one minute) before the reservation reception time has been reached. The processing section 530 determines assignment of the players who have reserved game play at the reservation reception time to the game terminals 70, and causes the image display section 540 to display the next play assignment screen in which the determined assignment is listed, as shown in FIG. 18, for example.

Data relating to the assignment of the players to the game terminals 70 is stored as play assignment information 623. FIG. 31 is a view showing an example of the data configuration of the play assignment information 623. As shown in FIG. 31, a game play date 623a and a playable team name 623b are stored as the play assignment information 623. A terminal ID 623c, a player ID 623d and a player name 623e of the player assigned to the terminal are also stored as the play assignment information 623 in units of the game terminals 70 while being associated with one another.

When the reservation reception time has been reached and the standby completion notifications indicating completion of standby of game play have been received from all of the scheduled game terminals 70 (game terminals 70 to which the players are assigned), the processing section 530 distributes game start instructions to the game terminals 70 to cause the game terminals 70 to start game play. When the standby completion notifications have not been received from all of the scheduled game terminals 70 even if a specific time (e.g., 30 seconds) has expired from the reservation reception time, the processing section 530 distributes the game start instructions to only the game terminals 70 from which the standby completion notification has been received to cause the game terminals 70 to start the next game play.

In FIG. 28, the display section 540 displays a display screen based on an image signal from the processing section 530. The function of the display section 540 is implemented by hardware such as a CRT, an LCD, an ELD, or a PDP. In FIG. 2, the large screen 56 and the display 52 correspond to the display section 540.

The communication section 560 connects with the communication line N based on a control signal from the processing section 530, and performs data communication with an external device (e.g. game terminal 70). The function of the communication section 560 is implemented by a wireless communication module, a TA, a router, a jack for a communication cable, a control circuit, or the like.

The storage section 600 stores a system program for implementing the functions for causing the processing section 530 to integrally control the terminal 50, a program and data necessary for implementing the functions according to this embodiment, and the like. The storage section 600 is used as a work area for the processing section 530, and temporarily stores the results of calculations performed by the processing section 530 based on various programs, data input from the operation input section 510, and the like. The function of the storage section 600 is implemented by an IC memory, a hard disk, a CD-ROM, a DVD, an MO, a RAM, a VRAM, or the like.

In this embodiment, the storage section 600 stores a reservation management program 610, the reservation information 621, and the play assignment information 623. Process flow
(A) Matching Process FIGS. 32 to 36 are flowcharts illustrative of the flow of the process of the matching server 10. The matching process is implemented by causing the matching control section 121 to execute the matching program 210.

As shown in FIGS. 32 to 36, the matching control section 121 determines whether or not the matching request transmitted from the game terminal 70 has been received. When the matching request transmitted from the game terminal 70 has been received (step A1: YES), the matching control section 121 specifies the location (store name) of the game terminal 70 from the terminal ID received together with the matching request referring to the terminal location information 221 (step A3).

The matching control section 121 determines whether or not the matching reception information 231 corresponding to the team to which the player belongs received together with the matching request and the specified store exists. When the corresponding matching reception information 231 exists (step A5: YES), the matching control section 121 adds the player of the specified game terminal 70 to the matching reception information 231 (step A7). When the corresponding matching reception information 231 does not exist (step A5: NO), the matching control section 121 generates the matching reception information 231 corresponding to the team received and the specified store, and adds the player of the specified game terminal 70 to the generated matching reception information 231 (step A9). The matching control section 121 sets the reception deadline time (e.g., 45 seconds after the reception time) of the generated matching reception information 231 based on the reception time of the request (step A11).

The matching control section 121 then performs a process of a loop A for each piece of the matching reception information 231. In the loop A, the matching control section 121 determines whether or not the reception deadline time set for the target matching reception information 231 has been reached. When the reception deadline time has been reached (step A13: YES), the matching control section 121 generates a local group formed of the players of the target matching reception information 231 (step A15). The matching control section 121 sets the present time to be the generation time of the generated local group (step A17), and calculates the total ability value and the average ability value from the level of each player forming the local group (step A19). The matching control section 121 then performs a local group process for the local group (step A21).

Figure 35:
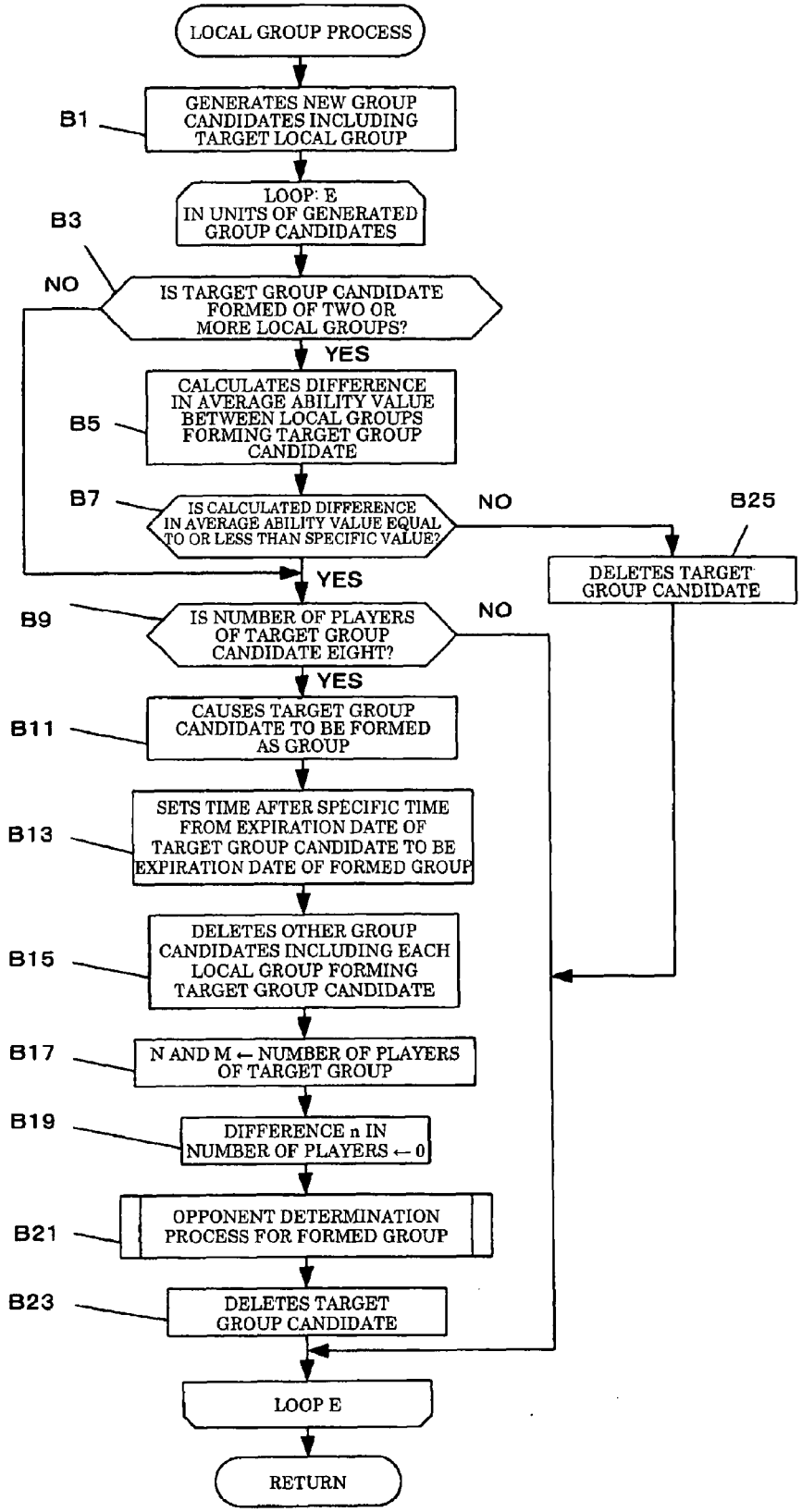
FIG. 35 is a flowchart showing a local group process executed during the matching process.

FIG. 35 is a flowchart illustrative of the flow of the local group process. As shown in FIG. 35, the matching control section 121 generates new group candidates including the target local group (step B1). The matching control section 121 then performs a process of a loop E for each of the generated group candidates.

In the loop E, the matching control section 121 determines whether or not the target group candidate is formed of two or more local groups. When the target group candidate is formed of two or more local groups (step B3 YES), the matching control section 121 calculates the difference in average ability value between the local groups forming the target group candidate (step B5). The matching control section 121 then compares the calculated difference in average ability value with a specific value. When the calculated difference in average ability value exceeds the specific value (step B7: NO), the matching control section 121 deletes the target group candidate (step B25).

When the calculated difference in average ability value is equal to or less than the specific value (step B7: YES), the matching control section 121 determines the number of players of the target group candidate. When the number of players of the target group candidate is eight (step B9: YES), the matching control section 121 causes the target group candidate to be formed as a group (step B11). The matching control section 121 then sets the expiration date of the formed group based on the expiration date set for the target group candidate (step B13). The matching control section 121 deletes other group candidates including each local group forming the target group candidate (step B15).

The matching control section 121 then sets the number of players of the target group as the variables M and N (step B17), and sets the difference n in number of players at zero (step B19). The matching control section 121 then performs an opponent determination process for the formed group (step B21).

Figure 36:
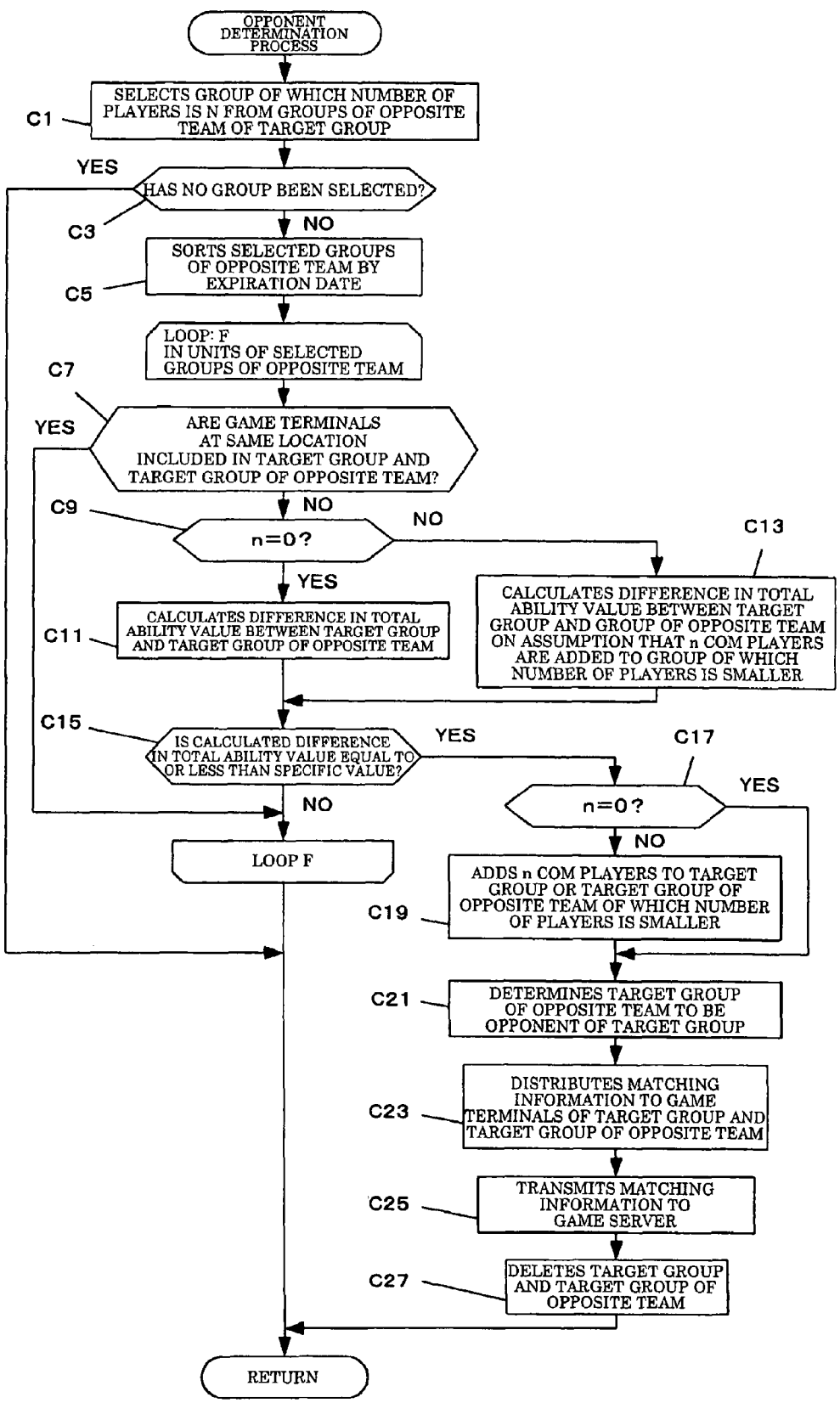
FIG. 36 is a flowchart showing an opponent determination process executed during the matching process.

FIG. 36 is a flowchart illustrative of the flow of the opponent determination process. As shown in FIG. 36, the matching control section 121 selects a group G of which the number of players is M from the groups of the opposite team of the target group (step C1). When no group has been selected (step C3: YES), the matching control section 121 finishes the opponent determination process. When one or more groups of the opposite team have been selected (step C3: NO), the matching control section 121 sorts the selected groups of the opposite team by the set expiration date (step C5), and sequentially performs a process of a loop F for each of the selected groups of the opposite team.

In the loop F, the matching control section 121 determines whether or not the game terminals 70 at the same location are included in the target group and the target group of the opposite team. When the game terminal 70 at the same location are included in the target group and the target group of the opposite team (step C7: YES), the matching control section 121 finishes the process of the loop F for the target group of the opposite team.

When the game terminals 70 at the same location are not included in the target group and the target group of the opposite team (step C7: NO), the matching control section 121 determines the difference n in number of players. When the difference n in number of players is zero (step C9: YES), the matching control section 121 calculates the difference in total ability value between the target group and the target group of the opposite team (step C1). When the difference n in number of players is one or more (step C9: NO), the matching control section 121 calculates the total ability difference between the target group and the group of the opposite team on the assumption that n COM players are added to the target group or the target group of the opposite team of which the number of players is smaller (step C13).

The matching control section 121 then compares the calculated difference in total ability value with a specific value. When the calculated difference in total ability value exceeds the specific value (step C15: NO), the matching control section 121 finishes the process of the loop F for the target group of the opposite team. When the calculated difference in total ability value is equal to or less than the specific value (step C15: YES), the matching control section 121 determines the difference n in number of players. When the difference n in number of players is one or more (step C17: NO), the matching control section 121 adds n COM players to the target group or the target group of the opposite team of which the number of players is smaller (step C19).

The matching control section 121 then determines the target group of the opposite team to be an opponent of the target group (step C21). The matching control section 121 then distributes the matching information to the game terminals 70 of the target group and the target group of the opposite team matched with the target group (step C23), and transmits the matching information 239 to the game server 30 (step C25). The matching control section 121 then deletes the target group and the target group of the opposite team (step C27). The matching control section 121 thus completes the opponent determination process.

Again referring to FIG. 35, after completion of the opponent determination process, the matching control section 121 deletes the target group candidate (step B23). The process of the loop E is performed in this manner. When the matching control section 121 has completed the process of the loop E for all of the group candidates, the matching control section 121 finishes the local group process.

Again referring to FIG. 32, after completion of the local group process, the matching control section 121 deletes the target matching information 239 (step A23). The process of the loop A is performed in this manner. When the matching control section 121 has completed the process of the loop A for all of the matching reception information 231, the matching control section 121 then performs a process of a loop B for each group candidate.

In the loop B, the matching control section 121 determines whether or not the expiration date set for the target group candidate has been reached. When the expiration date set for the target group candidate has been reached (step A25: YES), the matching control section 121 causes the target group candidate to be formed as a group (step A27). The matching control section 121 then sets the expiration date of the formed group based on the expiration date set for the target group candidate (step A29). The matching control section 121 deletes other group candidates including each local group forming the target group candidate (step A31).

The matching control section 121 then sets the number of players of the target group candidate to be the number of players M of the target group and the number of players N of the group of the opposite team (step A33), and sets the difference n in number of players at zero (step A35). The matching control section 121 then performs the opponent determination process (see FIG. 36) for the formed group (step A37).

When the matching control section 121 has finished the opponent determination process, the matching control section 121 deletes the target group candidate (step A39). The process of the loop B is performed in this manner. When the matching control section 121 has completed the process of the loop B for all of the group candidates, the matching control section 121 then performs a process of a loop C for each group.

In the loop C, the matching control section 121 determines whether or not the expiration date set for the target group has been reached. When the expiration date set for the target group has been reached (step A41: YES), the matching control section 121 sets the number of players of the target group at N (step A43). The matching control section 121 then performs a process of a loop D while setting the difference n in number of players at "1", "2", "3", and "4".

In the loop D, the matching control section 121 sets the number of players M of the group of the opposite team as the opponent of the target group at "M-N" obtained by subtracting the difference n in number of players from the number of players N of the target group (step A45). When M is four or more and eight or less (step A47: YES), the matching control section 121 then performs the opponent determination process (see FIG. 36) for the target group (step A49).

After completion of the opponent determination process, the matching control section 121 determines whether or not the target group has been matched by the opponent determination process. When the target group has been matched by the opponent determination process (step A51: YES), the matching control section 121 finishes the process of the loop C for the target group.

When the target group has not been matched by the opponent determination process (step A51: NO) or the number of players M of the group of the opposite team is less than three or exceeds eight (step A47: NO), the matching control section 121 sets the number of players M of the group of the opposite team at "M+n" obtained by adding the difference n in number of players to the number of players M of the target group (step A53). When M is four or more and eight or less (step A55: YES), the matching control section 121 then performs the opponent determination process (see FIG. 36) for the target group (step A57).

After completion of the opponent determination process, the matching control section 121 determines whether or not the target group has been matched by the opponent determination process. When the target group has been matched by the opponent determination process (step A59: YES), the matching control section 121 finishes the process of the loop C for the target group.

When the matching control section 121 has completed the process of the loop D while setting the difference n in number of players at "1", "2", "3", and "4", the matching control section 121 generates a group of the opposite team formed of COM players in a number equal to the number of players of the target group (step A61), and determines the generated group of the opposite team to be an opponent of the target group (step A63). The matching control section 121 then distributes the matching information 239 to the game terminals 70 of the target group (step A65), and transmits the matching information 239 to the game server 30 (step A67). The matching control section 121 then deletes the target group (step A69).

When the matching control section 121 has completed the process of the loop C for all of the groups, the matching control section 121 returns to the step A1.

(B) Reservation Management Process

Figure 37:
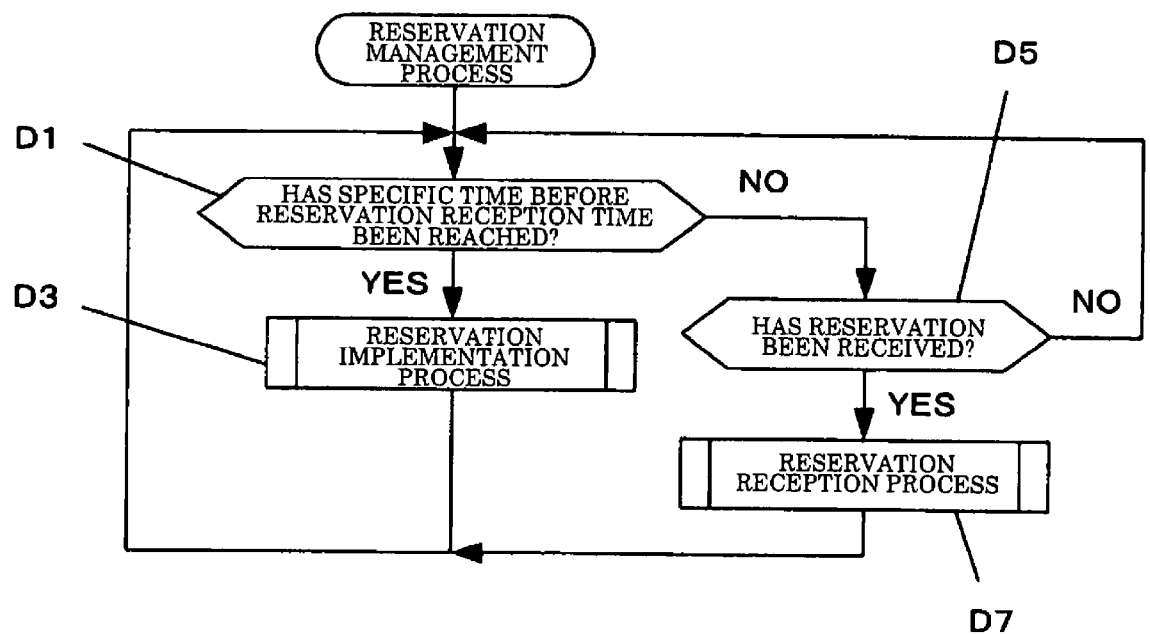
FIG. 37 is a flowchart showing a reservation management process of a terminal.
Figure 38:
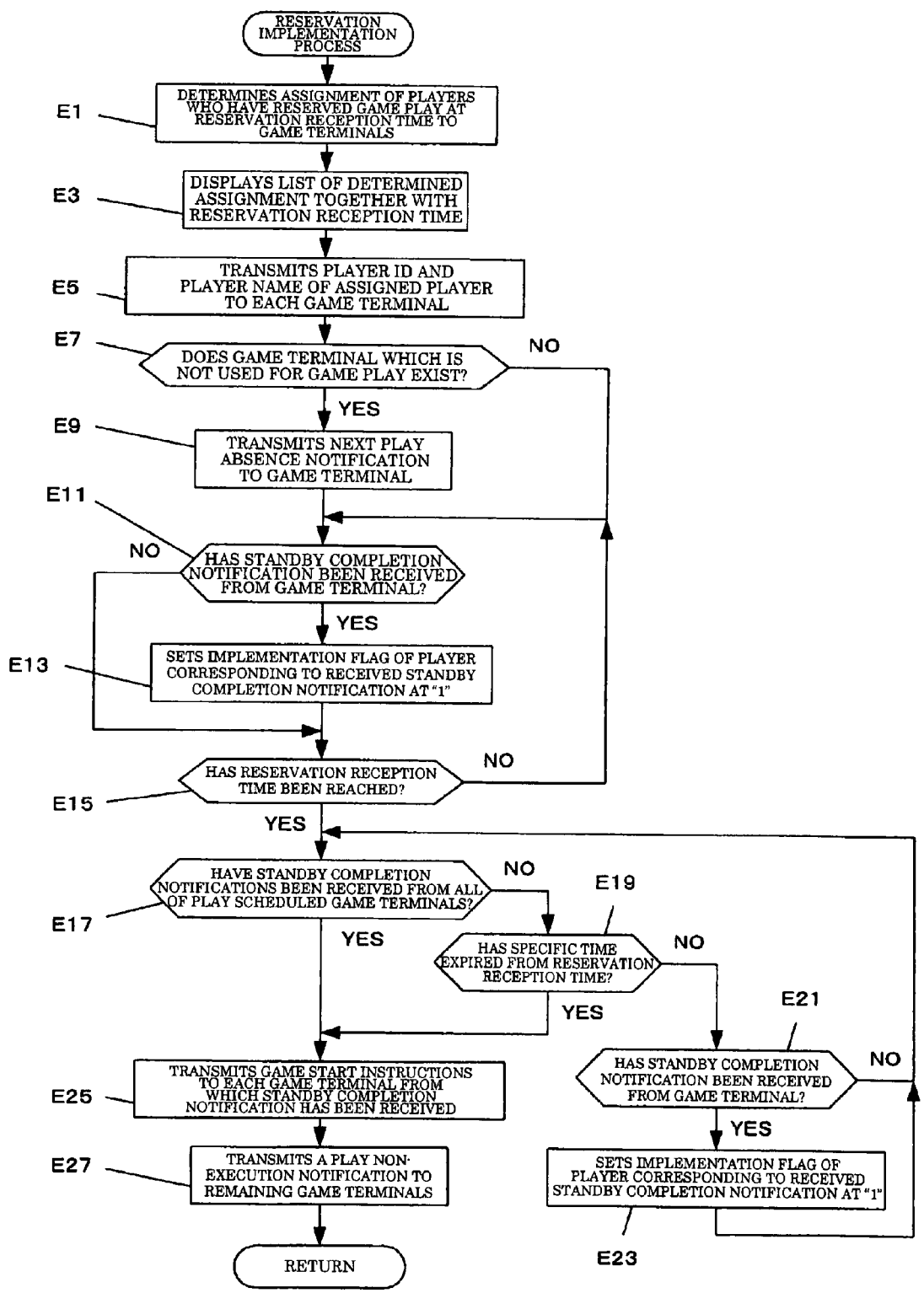
FIG. 38 is a flowchart showing a reservation implementation process executed during the reservation management process.
Figure 39:
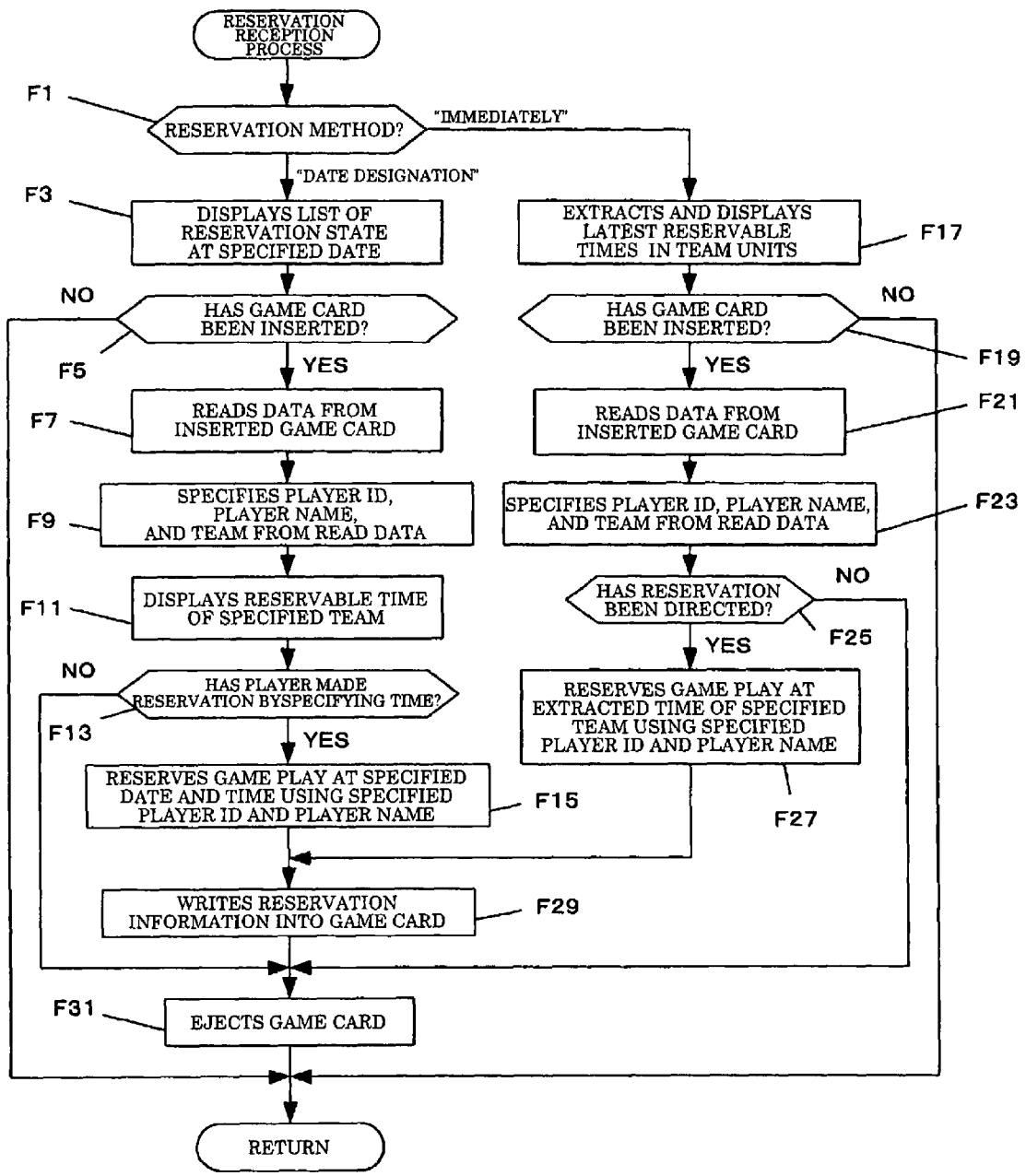
FIG. 39 is a flowchart showing a reservation reception process executed during the reservation management process.

FIGS. 37 to 39 are flowcharts illustrative of the flow of a reservation management process of the terminal 50. The reservation management process is implemented by causing the processing section 530 to execute the reservation management program 610. As shown in FIG. 37, the processing section 530 refers to the reservation information 621. When a specific time (e.g., one minute) before the reservation reception time has been reached (step D1: YES), the reservation implementation section 533 performs a reservation implementation process (step D3).

FIG. 38 is a flowchart illustrative of the flow of the reservation implementation process. As shown in FIG. 38, the reservation implementation section 533 closes reception of reservation at the next reservation reception time, and determines assignment of the players who have reserved game play at the reservation reception time to the game terminals 70 (step E1). The reservation implementation section 533 causes the next play assignment screen in which the determined assignment of the players to the game terminals 70 is listed to be displayed together with the reservation reception time (step E3).

The reservation implementation section 533 transmits the player ID and the player name of the player assigned to each game terminal 70 to each game terminal 70 (scheduled game terminal 70) (step E5). The reservation implementation section 533 determines whether or not the game terminal 70 which is not used for game play (game terminal 70 to which a player is not assigned) exists. When such a game terminal 70 exists (step E7: YES), the reservation implementation section 533 transmits a next play absence notification which indicates that the next game play is reserved to the game terminal 70 (step E9). When the reservation implementation section 533 has received the standby completion notification transmitted from the game terminal 70 (step E11: YES), the reservation implementation section 533 sets the implementation flag of the player corresponding to the received standby completion notification at "1" (step E13).

When the reservation reception time has been reached (step E15: YES), the reservation implementation section 533 determines whether or not the standby completion notifications have been received from all of the scheduled game terminals 70. When the standby completion notifications have been received from all of the scheduled game terminals 70 (step E17: YES), the reservation implementation section 533 transmits the game start instructions to each game terminal 70 from which the standby completion notification has been received (step E25). The reservation implementation section 533 transmits a play non-execution notification which indicates that the next game play is not performed to the remaining game terminals 70 (step E27).

When the standby completion notifications have not been received from all of the scheduled game terminals 70 (step E17: NO), the reservation implementation section 533 determines whether or not a specific time (e.g., 30 seconds) has expired from the reservation reception time. When the specific time has not expired (step E19: NO), the reservation implementation section 533 waits for the standby completion notification to be transmitted from the game terminal 70. When the standby completion notification has been received (step 21: YES), the reservation implementation section 533 sets the implementation flag of the player corresponding to the received standby completion notification at "1" (step E23).

The reservation implementation section 533 determines whether or not the standby completion notifications have been received from all of the scheduled game terminals 70. When the standby completion notifications have been received from all of the scheduled game terminals 70 (step E17: YES), the reservation implementation section 533 transmits the game start instructions to each game terminal 70 from which the standby completion notification has been received (step E25). The reservation implementation section 533 transmits the play non-execution notification which indicates that the next game play is not performed to the remaining game terminals 70 (step E27).

When a specific time has expired from the reservation reception time (step E19: YES), the reservation implementation section 533 transmits the game start instructions to each game terminal 70 from which the standby completion notification has been received (step E25), and transmits the play non-execution notification to the remaining game terminals 70 (step E27). The reservation implementation section 533 thus completes the reservation implementation process.

Again referring to FIG. 37, after completion of the reservation implementation process, the processing section 530 returns to the step D1. When game play reservation has been selected (step D5: YES), the reservation reception section 531 performs a reservation reception process (step D9).

FIG. 39 is a flowchart illustrative of the flow of the reservation reception process. As shown in FIG. 39, the reservation reception section 531 causes the reservation menu screen to be displayed. When the reservation method selected using the reservation menu screen is "date designation" (step F1: "date designation"), the reservation reception section 531 refers to reservation information 621 and causes the reservation state screen to be displayed in which the reservation state at the date specified using the date designation screen is listed (step F3).

When the game card 80 has been inserted (step F5: YES) and data read from the inserted game card 80 has been input from the card read/write section 520 (step F7), the reservation reception section 531 specifies the player and the team to which the player belongs from the input data (step F9), and causes the reservable time at which the player of the specified team can play a game to be selectably displayed in the reservation state screen (step F1).

When the player has selected the time using the reservation state screen to direct reservation (step F13: YES), game play at the selected reservation reception time is reserved using the specified player ID and player name (step F15). The reservation reception section 531 then causes the card read/write section 520 to record the received reservation information (e.g., store name and reservation time) in the game card 80 (step F29), and eject the game card 80 (step F31).

When the reservation method selected using the reservation menu screen is "immediately" (step F1: "immediately"), the reservation reception section 531 refers to the reservation information 621, and extracts the reservable times at the present date or a date after the present date in team units from the reservation reception times at which the team can play a game, and causes the latest vacancy state screen to be displayed in which the extracted times are listed (step F17).

When the game card 80 has been inserted (step F19: YES) and data read from the inserted game card 80 has been input from the card read/write section 520 (step F21), the reservation reception section 531 specifies the player and the team to which the player belongs from the input data (step F23). The reservation reception section 531 then selects the extracted reservation reception time at which the specified team can play a game and which is closest to the present time. When the player has directed reservation at the selected time (step F25: YES), game play at the selected time is reserved using the specified player ID and player name (step F27). The reservation reception section 531 then causes the card read/write section 520 to record the received reservation information (e.g., store name and reservation time) in the game card 80 (step F29), and eject the game card 80 (step F31). The reservation reception section 531 thus completes the reservation reception process.

Again referring to FIG. 37, after completion of the reservation reception process, the processing section 530 returns to the step D1. The reservation management process is performed in this manner.

(C) Game Process

Figure 40:
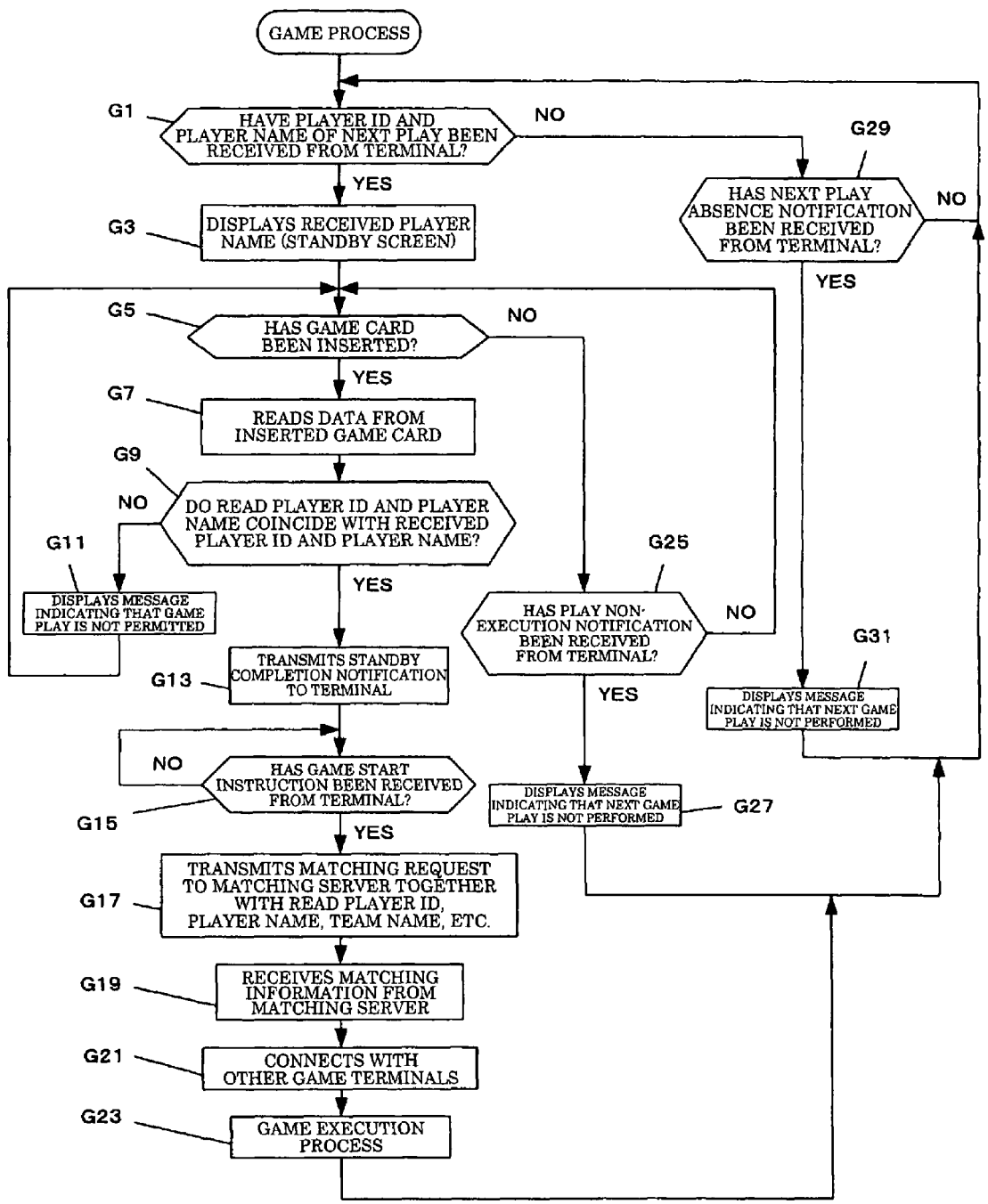
FIG. 40 is a flowchart showing a game process of a game terminal.

FIG. 40 is a flowchart illustrative of the flow of a game process of the game terminal 70. As shown in FIG. 40, the game terminal 70 determines whether or not the player ID and the player name of the next play have been received from the terminal 50. When the player ID and the player name of the next play have been received from the terminal 50 (step G1: YES), the game terminal 70 displays a standby screen in which the received player name is displayed (step G3).

When the game card 80 has been inserted (step G5: YES) and data read from the inserted game card 80 has been input from the card read/write section 520 (step G7), the game terminal 70 determines whether or not the player ID and the player name included in the input data coincide with the player name and the player name received from the terminal 50. When the game terminal 70 has determined that the player ID and the player ID included in the input data do not coincide with the player name and the player name received from the terminal 50 (step G9: NO), the game terminal 70 displays a message indicating that game play is not permitted (step G11), and returns to the step G5. In this case, the game terminal 70 may display a message indicating that the game terminal 70 assigned in the terminal 50 is checked or a message indicating that game play is reserved by the terminal 70 together with the correct reservation time recorded in the game card 80 or a message indicating that game play is not reserved in addition to the message indicating that game play is not permitted.

When the game terminal 70 has determined that the player ID and the player ID read from the game card 80 coincide with the player name and the player name received from the terminal 50 (step G9: YES), the game terminal 70 transmits the standby completion notification to the terminal 50 (step G13). When the game terminal 70 has received the game start instruction from the terminal 50 (step G15: YES), the game terminal 70 transmits the matching request to the matching server 10 (step G17).

The game terminal 70 receives the matching information 239 transmitted from the matching server 10 (step G19), connects with other game terminals 70 based on the received matching information 239 (step G21), and executes the communication game with the other game terminals 70 under control of the game server 30 (step G23). After completion of the communication game, the game terminal 70 returns to the step G1.

When the game card 80 has not been inserted (step G5: NO) and the game terminal 70 has received the play non-execution notification transmitted from the terminal 50 (step G25: YES), the game terminal 70 displays a message indicating that the next game play is not performed (step G27). The game terminal 70 then returns to the step G1. When the player ID and the player name of the next play have not been received from the terminal 50 (step G1: NO) and the game terminal 70 has received the next play absence notification transmitted from the terminal 50 (step G29: YES), the game terminal 70 displays a message indicating that the next game play is not performed (step G31). The game terminal 70 then returns to the step G1. The game process is performed in this manner.

Effects

As described above, the matching process according to this embodiment is generally implemented by two-stage matching. Specifically, (1) in-store matching is performed in which a local group LG of players who belong to the same store and the same team is generated, and (2) out-of-store matching is then performed in which a group G of each team is generated by combining the local groups LG and groups G of different teams are determined to be opposite groups. In out-of-store matching (2), same-team matching is performed in which local groups LG of the same team are combined to generate a group G of players belonging to the same team, and match matching is then performed in which groups G of different teams are combined as opposite groups. Specifically, the group G is formed so that the players who belong to the same store and the same team are necessarily included in the same group G. This enables friends visiting a store to enjoy a game in the same group G, for example.

Modification

The embodiments to which the invention can be applied are not limited to the above embodiment. Various modifications and variations may be made without departing from the spirit and scope of the invention.

(A) Priority of Local Groups LG Combined as Group G

For example, a group G may be formed by preferentially combining local groups LG having the smallest difference in average ability value.

(B) Groups G which Play a Match

In the above embodiment, groups G of different teams of which the number of players is the same and the generation time is earlier (older) are preferentially caused to play a match. Note that groups G having the closest total ability values may be preferentially caused to play a match regardless of the number of players and the generation time. In this case, a condition may set for the numbers of players of groups to be matched. For example, groups may not be matched when the numbers of players do not satisfy a specific condition (e.g., the ratio of the numbers of players is two or more), and the group may be matched with a group of which the total ability value is next closest to that of the group.

(C) Match Allowable Level Difference Condition

A condition whereby the difference in total ability value between the groups G is equal to or less than a specific value is employed in the above embodiment as the match allowable level difference condition for the groups G to be matched. Note that a condition whereby the ratio of the total ability values is equal to or less than a specific ratio (e.g., two or less) may also be employed. The specific ratio may be changed depending on the level of the player included in the group G (D) New Player Only new players may be matched. Specifically, local groups formed only of new players are generated in team units, and a group is generated by combining the generated local groups LG so that the number of players is a specific number (e.g., four). The generated group formed only of new players is matched so that groups of different teams play a match.

(E) Reservation Management

In the above embodiment, the terminal 50 transmits the player ID and the player name of the player who performs the next game play and assigned to the game terminal 70 to each game terminal 70, and the game terminal 70 determines whether or not the player ID and the player name read from the inserted game card 80 coincide with the player ID and the player name received from the terminal 50 to determine whether or not the player has reserved game play. Note that the game terminal 70 may transmit the player ID and the player name read from the inserted game card 80 to the terminal 50, the terminal 50 may determine whether or not the player has reserved game play based on the player ID and the player name received from each game terminal 70 to determine whether or not to perform game play in each game terminal 70.

In this case, when the player having the player ID and the player name received from the game terminal 70 has not reserved game play, the presence or absence of reservation of the player is determined referring to the reservation information 621. When the player has not reserved game play, the game terminal 70 displays a message indicating that the player has not reserved game play or a message prompting the player to reserve game play using the terminal 50. When the player has reserved game play at another time, the game terminal 70 may display a message indicating that the game terminal 70 stands by until the reservation time together with the reservation time.

(F) Game Management

The above embodiment illustrates an example in which game reservations are managed by the time. Note that game reservations may be managed using a game number (No.) assigned to each game play. The game number is a play order number indicating the play order of each game play. The game number of the present game play is incremented by one each time game play is performed using the game terminal 70.

(F-1)

Specifically, an Item "Game Designation" which Allows the Player to Reserve game play by specifying the game number and an item "immediately" which allows the player to reserve game play at the earliest playable time are displayed on a reservation menu screen (not shown) as the reservation menu. When the player has selected the item "game designation" using the reservation menu screen, a reservation state screen in which the present reservation state is listed is displayed as shown in FIG. 41, for example. As shown in FIG. 41, the name of the playable team, the reservable number, and the scheduled start time are listed on the reservation state screen in time series in units of game numbers after the present game play. The scheduled start time is a scheduled game start time calculated from the present time, the time (e.g., seven minutes) required for one game play, and the like.

When the player has inserted the game card 80, the reservable game numbers (game numbers of which the reservable number is one or more) among the game numbers of the team of the player read from the game card 80 are displayed to be selectable on the reservation state screen. When the player has selected the game number displayed to be selectable, the game of the selected game number is reserved.

When the player has selected the item "immediately" using the reservation menu screen, the vacancy state screen showing the latest vacancy state is displayed as shown in FIG. 42, for example. As shown in FIG. 42, the game numbers which can be reserved by the player of each team are listed on the vacancy state screen together with the reservable numbers in the order from the game number of which the scheduled start time is closest to the present time.

When the player has inserted the game card 80, a message (not shown) which inquires of the player whether or not to reserve game play is displayed on the vacancy state screen together with the game numbers which can be reserved by the team of the player read from the game card 80. When the player has selected reservation in response to the message, the game of the game number is reserved.

Figure 43:
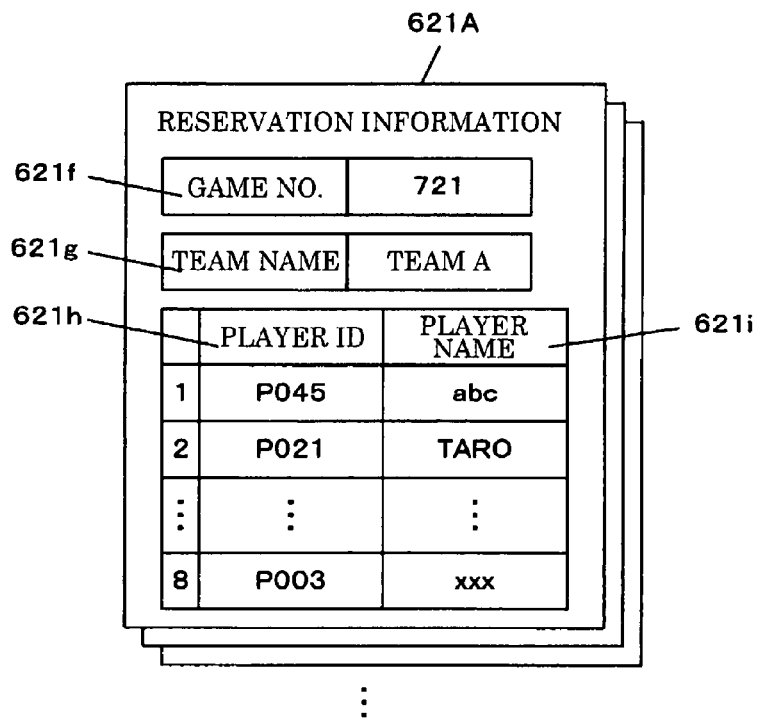
FIG. 43 shows a data configuration example of reservation information according to a modification.

FIG. 43 is a view showing the data configuration of reservation information 621A in this case. As shown in FIG. 43, the reservation information 621A is generated in game units. A game number 621*f* and a team name 621*g* are stored as the reservation information 621A. A player ID 621*h* and a player name 621*i* of each player who has reserved the game are also stored as the reservation information 621A while being associated with each other.

(F-2)

Figure 44:
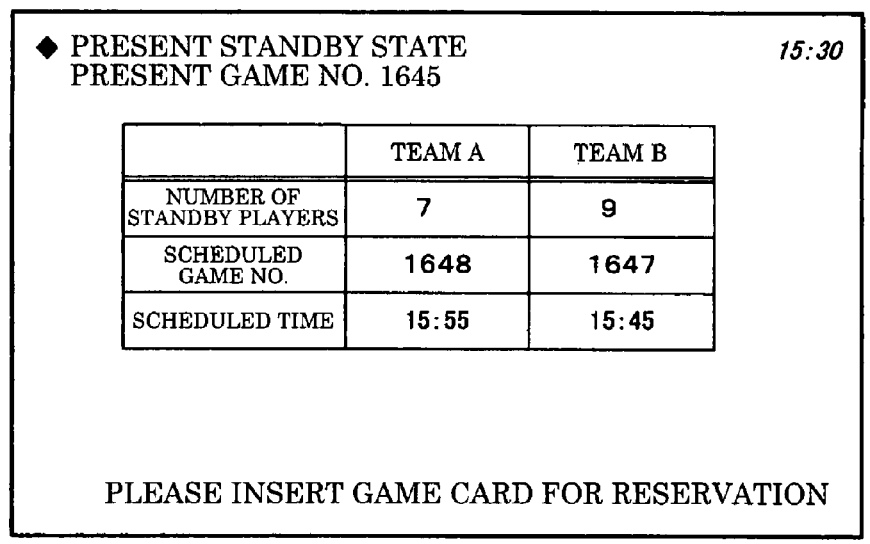
FIG. 44 shows an example of a standby state screen according to a modification.

Alternatively, Game Reservations May be Received in the Order of Receipt. Specifically, when the player makes a reservation, a standby state screen showing the present standby state is displayed as shown in FIG. 44, for example. As shown in FIG. 44, the present number of standby players, the scheduled game number, and the scheduled time are displayed on the standby state screen. The number of standby players refers to the number of players whose reservation has been received but who have not played a game. The scheduled game number refers to the game number available at the earliest time when reserved now. The scheduled game number is calculated from the present game number, the number of standby players, the number of players of one game play, and the like. Specifically, the scheduled game number is calculated by "game number of present game play+(number of standby players/number of players of one game play)". The scheduled time refers to a scheduled game start time. The scheduled time is calculated from the present time, the time (e.g., eight minutes) required for one game play, and the like. When the player has inserted the game card 80 in a state in which the standby state screen is displayed, reservation is received as a player of the team read from the game card 80.

Figure 45:
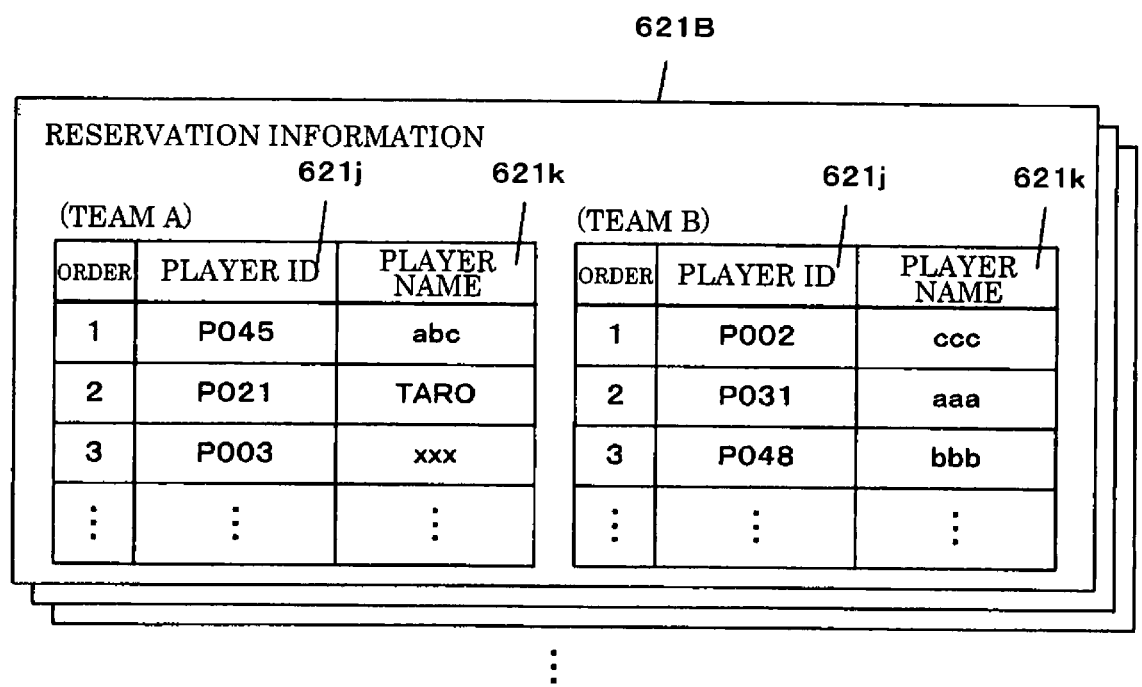
FIG. 45 shows a data configuration example of reservation information according to a modification.

FIG. 45 is a view showing the data configuration of reservation information 621B in this case. As shown in FIG. 45, a player ID 621*j* and a player name 621*k* of each player who has made a reservation are stored as the reservation information 621B in team units in the order of receipt.

When game play has completed, the reservation implementation section 533 of the terminal 50 determines the team of the next game play, such as allowing the players of each team to alternatively play a game. The reservation implementation section 533 then selects a specific number (e.g., eight) of players from the players of the determined team whose reservation has been received in order of receipt referring to the reservation information 621B, and assigns the selected players to the game terminals 70 as the players of the next game play.

When the number of players of the determined team whose reservation has been received is less than a specific number (e.g., eight), the reservation implementation section 533 may not assign players to the remaining game terminals 70 (terminals are not used for game play), or may assign the players of the other team to the remaining game terminals 70.

Game play may be reserved for the number of players who play a game at the same time. The players of the next game play may be selected so that the players in the reserved number can necessarily play a game at the same time.

(G) Reservation

The above embodiment illustrates an example in which the player reserves game play using the terminal 50 and plays a game using the game terminal 70 specified by the terminal 50 at the reserved time (advance reservation only). Note that reservation may be made unnecessary and the player may play a game using a vacant game terminal 70 (game terminal 70 which is not used for game play by other players). A time zone in which reservation is necessary (e.g., evening when it is expected that many players play a game) and a time zone in which reservation is unnecessary may be provided within one day. A game terminal 70 to which a player is not assigned or a game terminal 70 of which the assigned player is absent may be used by another player for each game play, for example.

(H) Number of Teams

The above embodiment illustrates an example in which the player belongs to one of two teams (team A and team B) specified in advance and a group of team A and a group of team B play a match. Note that groups of two different teams among three or more teams (team A, team B, team C, . . . ) may play a match (e.g., group of team A and group of team C, or group of team B and group of team C).

(I) Applicable Game

The above embodiment illustrates the case of applying the invention to the match game in which groups play a match. Note that the game need not necessarily be a match game. The invention can also be applied to other games in which a group is formed of two or more players.

Although only some embodiments of the invention have been described above in detail, those skilled in the art would readily appreciate that many modifications are possible in the embodiments without materially departing from the novel teachings and advantages of the invention. Accordingly, such modifications are intended to be included within the scope of the invention.

What is claimed is:

1. A method for a game system including game terminals, a schedule management device, a game server and a matching server, that allows a game server and a matching server defining a server system to perform a specific matching process based on matching requests from the game terminals to form groups that simultaneously play a specific communication game, the method comprising:
   storing geographic location information of the game terminals;
   receiving each of the matching requests by receiving a matching request signal transmitted from each of the game terminals, and team identification information that can specify each of teams set in advance to which a player of each of the game terminals belongs;
   forming the groups so that game terminals that satisfy a specific same location condition, belong to an identical team, and are selected from the game terminals for which the matching request has been received are incorporated in a single group referring to the location information stored and the team identification information;
   determining the groups that play a match by selecting groups of different teams from the groups that have been formed; and
   supplementing a computer-controlled player to at least one of the groups that play a match, of which the number of players is smaller than that of the other group, so that the numbers of players of the groups become equal, when the groups that play a match differ in numbers of players.

2. The method as defined in claim 1, the schedule management device being installed where a number of game terminals that are connected with the server system and satisfy the specific same location condition are installed, the schedule management device being connected with the game terminals to communicate therewith, the method comprising:
   setting a scheduled time of game play using each of the game terminals connected with the schedule management device and player identification information based on an operation input of a player to reserve game play at the set scheduled time;
   acquiring, from each of the game terminals connected with the schedule management device, the player identification information input to each of the game terminals based on an operation input of a player performed when playing a game using each of the game terminals;
   checking a present time, the acquired player identification information, and the reservations to determine whether or not a corresponding reservation exists; and
   permitting game play using each of the game terminals to which the acquired player identification information has been input when the corresponding reservation exists as a result of the determination.

3. The method as defined in claim 1,
   the forming of the groups further including forming the groups so that game terminals that satisfy a specific same location condition and belong to an identical team are incorporated in a single group referring to the team identification information and location information stored in a location storage section that stores the location information of each of the players terminals.

4. A game system including game terminals, a schedule management device, a matching server, and a game server, the matching server and game server defining a server system, the server system being configured to connect to the schedule management device and the game terminals via a communication link, and the server system being configured to perform a specific matching process based on matching requests from the game terminals to form groups that simultaneously play a specific communication game, the server system comprising:
   a location storage section configured to store geographic location information of the game terminals;
   a request reception section configured to receive each of the matching requests by receiving a matching request signal transmitted from each of the game terminals, and team identification information that can specify each team set in advance to which a player of each of the game terminals belongs;
   a group formation section configured to form the groups so that game terminals that satisfy a specific same location condition, belong to an identical team, and are selected from the game terminals for which the matching request has been received by the request reception section are incorporated in a single group referring to the location information stored in the location storage section and the team identification information;
   a match group determination section configured to determine the groups that play a match by selecting groups of different teams from the groups formed by the group formation section; and
   a supplementation section, when the groups that play a match determined by the match group determination section differ in numbers of players, configured to supplement a computer-controlled player to at least the group of which the number of players is smaller so that the numbers of players of the groups become equal.

5. The server system as defined in claim 4, the group formation section further including a local formation section that forms local groups of game terminals that satisfy the specific same location condition and are selected from the game terminals for which the matching request has been received by the request reception section, the group formation section forming the groups by combining the local groups formed by the local formation section.

6. The server system as defined in claim 5,
   the local formation section forming the local groups by combining game terminals that satisfy the same location condition and are selected from the game terminals for which the matching request has been received by the request reception section within a specific time from the time at which the matching request reception section received a first matching request, and then closing the formation of the local groups of the game terminals that satisfy the same location condition; and
   the group formation section forming the groups by combining the local groups that have been formed by the local formation section before the local formation section has closed the formation of the local groups.

7. The server system as defined in claim 5, the group formation section combining the local groups so that the number of players of each of the groups approaches an optimum number of group-forming players specified in advance.

8. The server system as defined in claim 5,
   the request reception section receiving level value identification information that can specify a play level value of a player of each of the game terminals together with the matching request signal; and
   the group formation section forming the groups by combining the local groups that are formed by the local formation section and have a total level value that satisfies a specific almost equal condition based on the received level value identification information.

9. The server system as defined in claim 4,
the match group determination section selecting the groups that play a match referring to the location information stored in the location storage section so that groups including the game terminals that satisfy the same location condition do not play a match.

10. The server system as defined in claim 4, the match group determination section determining the groups that play a match so that the difference in number of players between the groups becomes smaller.

11. The server system as defined in claim 4,
the request reception section receiving level value identification information that can specify a play level value of a player of each of the game terminals together with the matching request signal; and
the match group determination section determining the groups that play a match so that groups having a total level value that satisfies a specific match allowable level difference condition play a match based on the received level value identification information.

12. The game system as defined in claim 4, schedule management device being installed where the game terminals that are connected with the server system and satisfy the specific same location condition are installed, the schedule management device being connected with the game terminals to communicate therewith, the schedule management device comprising:
a reservation setting section that sets a scheduled time of game play using each of the game terminals connected with the schedule management device and player identification information based on an operation input of a player to reserve game play at the set scheduled time;
an acquisition section that acquires, from each of the game terminals connected with the schedule management device, the player identification information input to each of the game terminals based on an operation input of a player performed when playing a game using each of the game terminals;
a reservation check section that checks a present time, the acquired player identification information, and the reservations set in the reservation setting section to determine whether or not a corresponding reservation exists; and
a game execution permission control section that permits game play using each of the game terminals to which the acquired player identification information has been input when the reservation check section has determined that the corresponding reservation exists.

13. The game system as defined in claim 12,
the communication game being a game in which groups of different teams play a match; and
the reservation setting section setting a reservation of a player based on an operation input of the player in a reservable time zone corresponding to a team specified based on the operation input, the reservable time zone being specified in advance in units of the teams.

14. The game system as defined in claim 4, the schedule management device being installed where the game terminals that are connected with the server system and satisfy the specific same location condition are installed, the schedule management device being connected with the game terminals to communicate therewith, the schedule management device comprising:

a reservation setting section that sets a play order number of game play using each of the game terminals connected with the schedule management device and player identification information to reserve game play of the set play order number;
a play number count section that counts a present play order number based on game execution using each of the game terminals connected with the schedule management device;
an acquisition section that acquires, from each of the game terminals connected with the schedule management device, the player identification information input to each of the game terminals based on an operation input of a player performed when playing a game using each of the game terminals;
a reservation check section that checks the play order number counted by the play number count section, the acquired player identification information, and the reservations set in the reservation setting section to determine whether or not a corresponding reservation exists; and
a game execution permission control section that permits game play using each of the game terminals to which the acquired player identification information has been input when the reservation check section has determined that the corresponding reservation exists.

15. The game system as defined in claim 14,
the communication game being a game in which groups of different teams play a match; and
the reservation setting section setting the play order number in units of the teams and setting the play order number corresponding to a team specified based on an operation input of a player while associating the play order number with the player identification information of the player to set reservation of the player based on the operation input of the player.

16. The game system as defined in claim 12, the schedule management device further comprising a reservation display control section that displays the reservations set in the reservation setting section according to a scheduled game play order.

17. The game system as defined in claim 12, the schedule management device further comprising:
a terminal assignment section that assigns each of the game terminals connected with the schedule management device to a corresponding reservation set in the reservation setting section; and
a near reservation display control section that displays a reservation for at least next game play among the reservations set in the reservation setting section together with identification information of the player terminal assigned to the corresponding reservation by the terminal assignment section.

18. The game system as defined in claim 4, further comprising:
a location storage section that stores location information of each of the game terminals,
the group formation section forming the groups so that game terminals that satisfy a specific same location condition and belong to an identical team are incorporated in a single group referring to the location information and the team identification information.

* * * * *